(12) United States Patent
Kashiwabara et al.

(10) Patent No.: US 10,765,993 B2
(45) Date of Patent: Sep. 8, 2020

(54) GEL INCLUDING CONDENSATION PRODUCT OF ORGANIC SILICON COMPOUND

(71) Applicant: SUMITOMO CHEMICAL COMPANY, LIMITED, Tokyo (JP)

(72) Inventors: Taigo Kashiwabara, Osaka (JP); Ayumi Aoki, Osaka (JP); Takashi Kamikawa, Osaka (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 16/498,859

(22) PCT Filed: Oct. 11, 2017

(86) PCT No.: PCT/JP2017/036885
§ 371 (c)(1),
(2) Date: Sep. 27, 2019

(87) PCT Pub. No.: WO2018/179531
PCT Pub. Date: Oct. 4, 2018

(65) Prior Publication Data
US 2020/0047115 A1 Feb. 13, 2020

(30) Foreign Application Priority Data

Mar. 31, 2017 (JP) .................. 2017-072274

(51) Int. Cl.
*B01D 71/58* (2006.01)
*B01D 71/40* (2006.01)
(Continued)

(52) U.S. Cl.
CPC ........... *B01D 53/228* (2013.01); *B01D 69/02* (2013.01); *B01D 71/40* (2013.01); *B01D 71/82* (2013.01); *C08F 20/06* (2013.01); *C08F 2810/00* (2013.01)

(58) Field of Classification Search
None
See application file for complete search history.

(56) References Cited

U.S. PATENT DOCUMENTS

2014/0137740 A1    5/2014  Aburaya et al.
2014/0378612 A1*   12/2014 Dinkar ..................... C08K 3/36
                                                      524/860
(Continued)

FOREIGN PATENT DOCUMENTS

JP        02-199104 A     8/1990
JP        05-271549 A    10/1993
(Continued)

OTHER PUBLICATIONS

International Search Report of PCT/JP2017/036885 dated Nov. 21, 2017.
(Continued)

*Primary Examiner* — Daniel Berns
(74) *Attorney, Agent, or Firm* — Sughrue Mion, PLLC

(57) ABSTRACT

The present invention provides a gel containing a cross-linked polymer having at least one selected from the group consisting of an acidic dissociative group, an acidic dissociative group in a salt form, and a derivative group of an acidic dissociative group, and a condensate of a compound represented by the following formula (I): $Si\{R^1—N(R^2)(R^3)\}(OR^4)(OR^5)(R^6)$ (wherein each group is as defined in the DESCRIPTION).

11 Claims, 1 Drawing Sheet

(51) Int. Cl.
B01D 71/82 (2006.01)
B01D 53/22 (2006.01)
B01D 69/00 (2006.01)
B01D 69/02 (2006.01)
C08F 20/06 (2006.01)
C08L 33/02 (2006.01)
C08L 83/06 (2006.01)
C08L 83/08 (2006.01)

(56) References Cited

U.S. PATENT DOCUMENTS

| | | |
|---|---|---|
| 2015/0086801 A1 | 3/2015 | Hiraki et al. |
| 2015/0151244 A1 | 6/2015 | Ishizuka |
| 2016/0151740 A1 | 6/2016 | Ouchi et al. |
| 2016/0158693 A1 | 6/2016 | Ouchi et al. |
| 2017/0232398 A1 | 8/2017 | Ota et al. |

FOREIGN PATENT DOCUMENTS

| | | |
|---|---|---|
| JP | 11-240959 A | 9/1999 |
| JP | 2005-327703 A | 11/2005 |
| JP | 2010-035973 A | 2/2010 |
| JP | 2012-179584 A | 9/2012 |
| JP | 2013-27841 A | 2/2013 |
| JP | 2014-14806 A | 1/2014 |
| JP | 2016-26859 A | 2/2016 |
| JP | 2016-26860 A | 2/2016 |
| WO | 2013191147 A1 | 12/2013 |
| WO | 2014010336 A1 | 1/2014 |
| WO | 2014010512 A1 | 1/2014 |
| WO | 2015098518 A1 | 7/2015 |
| WO | 2016/024523 A1 | 2/2016 |
| WO | 2016163296 A1 | 10/2016 |

OTHER PUBLICATIONS

Zhao et al., "$CO_2$-Selective Membranes Containing Sterically Hindered Amines for $CO_2/H_2$ Separation", Industrial & Engineering Chemistry Research, vol. 52, 2013, pp. 8774-8782.

Xing et al., "Crosslinked polyvinylalcohol-polysiloxane/fumed silica mixed matrix membranes containing amines for $CO_2/H_2$ separation", Journal of Membrane Science, vol. 367, 2011, pp. 91-102.

Machine Translation of Japanese Publication 2012-179584 dated Sep. 20, 2012 (previously cited Sep. 27, 2019).

Machine Translation of Japanese Publication 02-199104 dated Aug. 7, 1990 (previously cited Sep. 27, 2019).

Machine Translation of Japanese Publication 11-240959 dated Sep. 7, 1999 (previously cited Sep. 27, 2019).

Machine Translation of Japanese Publication 2005-327703 dated Nov. 24, 2005 (previously cited Sep. 27, 2019).

Machine Translation of Japanese Publication 5-271549 dated Oct. 19, 1993 (previously cited Sep. 27, 2019).

Machine Translation of Japanese Publication 2010-35973 dated Feb. 18, 2010 (previously cited Sep 27, 2019).

* cited by examiner

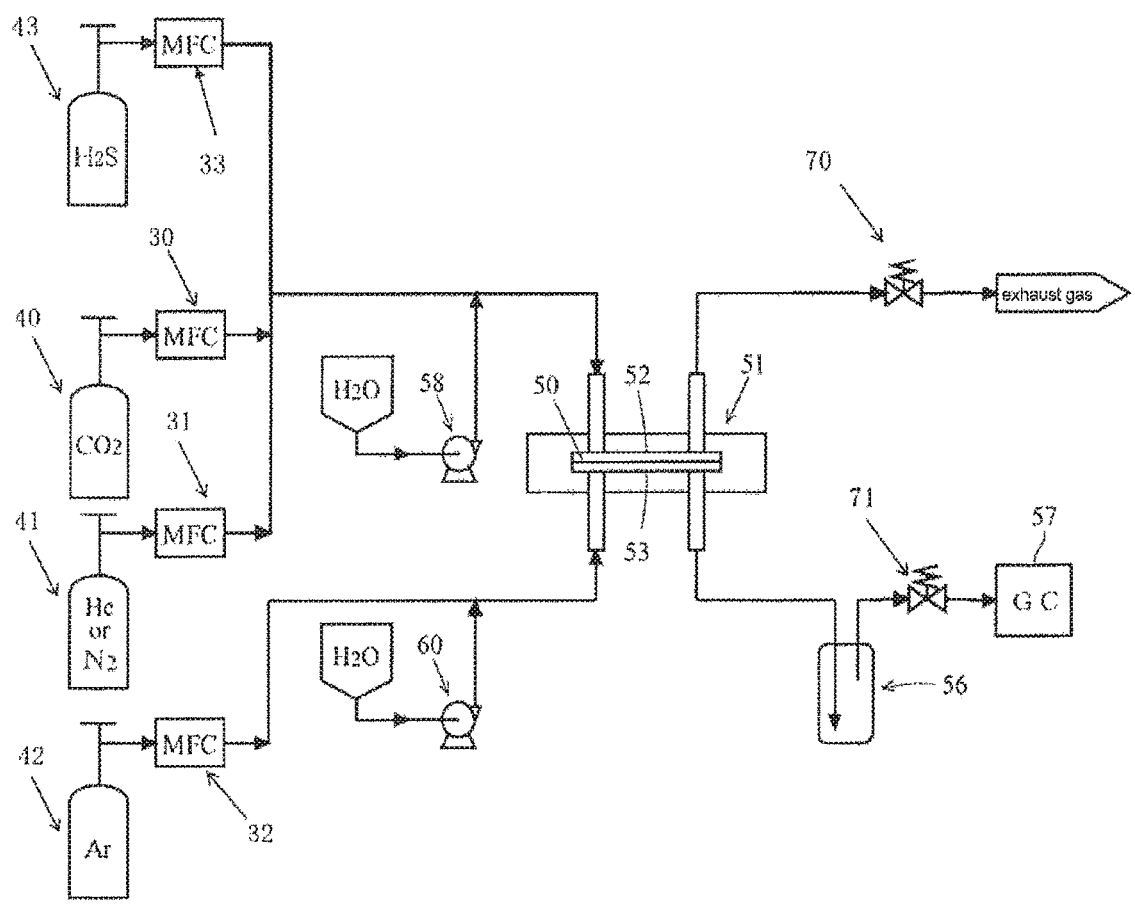

GEL INCLUDING CONDENSATION PRODUCT OF ORGANIC SILICON COMPOUND

CROSS REFERENCE TO RELATED APPLICATIONS

This application is a National Stage of International Application No. PCT/JP2017/036885 filed Oct. 11, 2017, claiming priority based on Japanese Patent Application No. 2017-072274 filed Mar. 31, 2017, the contents of all of which are incorporated herein by reference in their entirety.

TECHNICAL FIELD

The present invention relates to a gel containing a condensate of an organic silicon compound. The gel is useful for an acidic gas separation membrane.

BACKGROUND ART

A gas membrane separation process is attracting attention in recent years because it can realize energy saving as a process for separating an acidic gas from synthetic gases synthesized in large-scale plants such as hydrogen production, urea production and the like, natural gas, exhaust gas and the like. Various acidic gas separation membranes for the gas membrane separation process are being studied. For example, patent document 1 describes an acidic gas separation membrane containing an amine carrier.

DOCUMENT LIST

Patent Document patent document 1: WO 2016/163296 A1

SUMMARY OF THE INVENTION

Problems to be Solved by the Invention

When a mixed gas and an acidic gas separation membrane come into contact with each other on the supply side of the mixed gas, the acidic gas carriers such as amine carrier described in patent document I and the like react with the acidic gas contained in the mixed gas to promote incorporation of the acidic gas into the separation membrane, thus showing a function to promote transport of the acidic gas to the permeate side of the separation membrane (i.e., the side opposite to the supply side).
However, when an amine carrier (e.g., piperazine) such as those described in patent document 1 is used, the acidic gas carrier may flow out from the acidic gas separation membrane during use.

The present invention has been made in view of the above-mentioned situation, and the object thereof is to provide a gel capable of suppressing an outflow of an acidic gas carrier and useful for an acidic gas separation membrane.

Means of Solving the Problems

The present invention capable of achieving the above-mentioned object is as described below.
[1] A gel comprising a crosslinked polymer having at least one selected from the group consisting of an acidic dissociative group, an acidic dissociative group in a salt form, and a derivative group of an acidic dissociative group, and a condensate of a compound represented by the following formula (I):

$$Si\{R^1-N(R^2)(R^3)\}(OR^4)(OR^5)(R^6) \qquad (I)$$

wherein $R^1$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —$CH_2$— excluding —$CH_2$— adjacent to Si and —$CH_2$— adjacent to N in the aforementioned alkylene group and cycloalkanediyl group is/are optionally replaced by at least one selected from the group consisting of —O— and —$NR^7$— wherein $R^7$ is a hydrogen atom, an alkyl group optionally having substituent(s), a cycloalkyl group optionally having substituent(s), an aryl group optionally having substituent(s) or an aralkyl group optionally having substituent(s), $R^2$ and $R^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), $R^4$ and $R^5$ are each independently a hydrogen atom, an lo alkyl group optionally having substituent(s), a cycloalkyl group optionally having substituent(s), an aryl group optionally having substituent(s), or an aralkyl group optionally having substituent(s), and $R^6$ is an alkyl group optionally having substituent(s), a is cycloalkyl group optionally having substituent(s), an aryl group optionally having substituent(s), an aralkyl group optionally having substituent(s), a hydroxy group, an alkoxy group optionally having substituent(s), a cycloalkyloxy group optionally having substituent(s), an aryloxy group optionally having substituent(s), an aralkyloxy group optionally having substituent(s), or a group represented by —$R'^1$—$N(R'^2)(R'^3)$, wherein $R'^1$ is an alkylene group optionally having substituent(s), a cycloalkanediyl group optionally having substituent(s), an arenediyl group optionally having substituent(s), or a divalent group optionally having substituent (s) and being a combination of at least two selected from the group consisting of an alkylene group, a cycloalkanediyl group and an arenediyl group, and one or more —$CH_2$— excluding —$CH_2$— adjacent to Si and —$CH_2$— adjacent to N in the aforementioned alkylene group and cycloalkanediyl group is/are optionally replaced by at least one selected from the group consisting of —O—and —$NR'^7$— wherein $R'^7$ is a hydrogen atom, an alkyl group optionally having substituent(s), a cycloalkyl group optionally having substituent(s), an aryl group optionally having substituent(s) or an aralkyl group optionally having substituent(s), and $R'^2$ and $R'^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s).

The "compound represented by the formula (I)" in the aforementioned [1] is sometimes to be abbreviated as "Compound (I)" in the following. In addition, "Compound (I) wherein $R^6$ is a hydroxy group, an alkoxy group optionally having substituent(s), a cycloalkyloxy group optionally having substituent(s), an aryloxy group optionally having substituent(s) or an aralkyloxy group optionally having substituent(s)" is sometimes to be abbreviated as "Compound (Ia)".

[2] The gel of the aforementioned [1], wherein $R^1$ is an alkylene group optionally having substituent (s) and one or more —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or an alkyl group optionally having substituent(s).

[3] The gel of the aforementioned [1], wherein $R^1$ is a $C_{1-10}$ alkylene group optionally having substituent(s) and one or two —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or a $C_{1-6}$ alkyl group optionally having substituent(s).

[4] The gel of the aforementioned [1], wherein $R^1$ is a $C_{1-10}$ alkylene group and one or two —$CH_2$— excluding —$CH_2$— adjacent to Si and —$CH_2$— adjacent to N in the aforementioned alkylene group is/are optionally replaced by —NH—.

[5] The gel of any one of the aforementioned [1] to [4], wherein $R^2$ and $R^3$ are each independently a hydrogen atom, an alkyl group optionally having substituent (s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s).

[6] The gel of any one of the aforementioned [1] to [4], wherein $R^2$ and $R^3$ are each independently a hydrogen atom, a $C_{1-6}$ alkyl group optionally having substituent(s), a $C_{6-14}$ aryl group optionally having substituent(s), or a $C_{7-16}$ aralkyl group optionally having substituent(s), or they are bonded to each other to form, together with the adjacent nitrogen atom, a basic 3- to 12-membered nitrogen-containing heterocycle optionally having substituent(s).

[7] The gel of any one of the aforementioned [1] to [4], wherein $R^2$ and $R^3$ are each independently a hydrogen atom, a $C_{1-6}$ alkyl group, a phenyl group optionally having substituent(s), or a benzyl group optionally having substituent(s), or they are bonded to each other to form, together with the adjacent nitrogen atom, a basic monocyclic 4- to 8-membered nitrogen-containing heterocycle optionally having substituent(s).

[8] The gel of any one of the aforementioned [1] to [7], wherein $R^4$ and $R^5$ are each independently a hydrogen atom or an alkyl group.

[9] The gel of any one of the aforementioned [1] to [7], wherein $R^4$ and $R^5$ are each independently a hydrogen atom or a $C_{1-6}$ alkyl group.

[10] The gel of any one of the aforementioned [1] to [7], wherein $R^4$ and $R^5$ are each independently a hydrogen atom, a methyl group, an ethyl group, a propyl group or an isopropyl. group.

[11] The gel of any one of the aforementioned [1] to [7], wherein $R^4$ and $R^5$ are each independently a methyl group or an ethyl group.

[12] The gel of any one of the aforementioned [1] to [11], wherein $R^6$ is an alkyl group optionally having substituent(s), a hydroxy group or an alkoxy group.

[13] The gel of any one of the aforementioned [1] to [11], wherein $R^6$ is a $C_{1-6}$ alkyl group optionally having substituent(s), a hydroxy group or a $C_{1-6}$ alkoxy group.

[14] The gel of any one of the aforementioned [1] to [11], wherein $R^6$ is a methyl group optionally having substituent(s), a hydroxy group, a methoxy group or an ethoxy group.

[15] The gel of the aforementioned [1], wherein $R^1$ is an alkylene group optionally having substituent(s), and one or more —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or an alkyl group optionally having substituent(s), $R^2$ and $R^3$ are each independently a hydrogen atom, an alkyl group optionally having' substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent (s) , $R^4$ and $R^5$ are each independently a hydrogen atom or an alkyl group, and $R^6$ is an alkyl group optionally having substituent(s), a hydroxy group or an alkoxy group.

[16] The gel of the aforementioned [1], wherein $R^1$ is a $C_{2-10}$ alkylene group optionally having substituent(s), and one or two —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or a $C_{1-6}$ alkyl group optionally having substituent (s), $R^2$ and $R^3$ are each independently a hydrogen atom, a $C_{1-6}$ alkyl group optionally having substituent(s), a $C_{6-14}$ aryl group optionally having substituent(s), or a $C_{7-16}$ aralkyl group optionally having substituent(s), or they are bonded to each other to form, together with the adjacent nitrogen atom, a basic 3- to 12-membered nitrogen-containing heterocycle optionally having substituent(s), $R^4$ and $R^5$ are each independently a hydrogen atom or a $C_{1-6}$ alkyl group, and $R^6$ is a $C_{1-6}$ alkyl group optionally having substituent(s), a hydroxy group or a $C_{1-6}$ alkoxy group.

[17] The gel of the aforementioned [1], wherein $R^1$ is a $C_{1-10}$ alkylene group, and one or two —$CH_2$— excluding —$CH_2$— adjacent to Si and —$CH_2$— adjacent to N in the aforementioned alkylene group is/are optionally replaced by —NH, $R^2$ and $R^3$ are each independently a hydrogen atom, a $C_{1-6}$ alkyl group, a phenyl group optionally having substituent(s), or a benzyl group optionally having substituent(s), or they are bonded to each other to form, together with the adjacent nitrogen atom, a basic monocyclic 4- to 8-membered nitrogen-containing heterocycle optionally having substituent(s), $R^4$ and $R^5$ are each independently a hydrogen atom, a methyl group or an ethyl group, and $R^6$ a methyl group optionally having substituent(s), hydroxy group, a methoxy group or an ethoxy group.

[18] The gel of the aforementioned [1], wherein Compound (T) is at least one selected from the group consisting of 3-aminopropyitrimethoxysilane, 3-aminopropyitriethoxysilane, 3-(dimethylamino)propyltrimethoxysilane, 3-(dimethylamino)propyltriethoxysilane, N-phenyl-3-aminopropyltrimethoxysilane, N-phenyl-3-aminopropyltriethoxysilane, 3-piperazinopropyltrimethoxysilane, 3-piperazinopropyltriethoxysilane, 4-aminobutyltrimethoxysilane, 4-aminobutyltriethoxysilane, 4-aminophenyltrimethoxysilane, 4-aminophenyltriethoxysilane, 3-aminopropylmethyldimethoxysilane, 3-aminopropylmethyldiethoxysilane, 3-(2-aminoethylamino)propyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-trimethoxysilyl-N-(1,3-dimethylbutylidene)propylamine, 3-(dimethylamino)propylmethyldimethoxysilane, and 3-[2-(2-aminoethylamino)ethylamino]propyltrimethoxysilane.

[19] The gel of the aforementioned [1], wherein Compound (I) is at least one selected from the group consisting of 3-aminopropyltrimethoxysilane, 3-(dimethylamino)propyitrimethoxysilane, 3-piperazinopropyltrimethoxysilane, 3-(dimethylamino)propylmethyldimethoxysilane, and 3-(2-aminoethylamino)propyltrimethoxysilane.

[20] The gel of the aforementioned [1], wherein Compound (I) is 3-aminopropyitrimethoxysilane, 3-(dimethylamino)propyltrimethoxysilane, 3-piperazinopropyltrimethoxysilane or 3-(2-aminoethylamino)propyltrimethoxysilane, or a combination of 3-aminopropyltrimethoxysilane, 3-(dimethylamino)propyltrimethoxysilane, 3-piperazinopropyltrimethoxysilane or 3-(2-aminoethylamino)propyltrimethoxysilane and 3-(dimethylamino)propylmethyldimethoxysilane.

[21] The gel of the aforementioned [1], wherein Compound (I) is 3-(dimethylamino)propyltrimethoxysilane.

[22] The gel of any one of the aforementioned [1] to [21], wherein an amount of the structure derived from Compound (Ia) in the condensate of Compound (I) is 1-100 mol per 100 mol of all structures derived from Compound (I).

[23] The gel of any one of the aforementioned. [1] to [21], wherein an amount of the structure derived from Compound (Ia) in the condensate of Compound (I) is 3-100 mol per 100 mol of all structures derived. from Compound (I).

[24] The gel of any one of the aforementioned [1] to [21], wherein an amount of the structure derived from Compound (Ia) in the condensate of Compound (I) is 5-100 mol per 100 mol of all structures derived from Compound (I).

[25] The gel of any one of the aforementioned [1] to [21], wherein an amount of the structure derived from Compound (Ia) in the condensate of Compound (I) is 10-100 mol per 100 mol of all structures derived from. Compound (I).

[26] The gel of any one of the aforementioned [1] to [21], wherein an amount of the structure derived from. Compound (Ia) in the condensate of Compound. (I) is 20-100 mol per 100 mol of all structures derived from Compound (I).

[27] The gel of any one of the aforementioned [1] to [21], wherein an amount of the structure derived from Compound (Ia.) in the condensate of Compound (I) is 50-100 mol per 100 mol of all structures derived from Compound (I).

[28] The gel of any one of the aforementioned [1] to [21], wherein an amount of the structure derived. from Compound (Ia) in the condensate of Compound (I) is 70-100 mol per 100 mol of all structures derived from Compound (I).

[29] The gel of any one of the aforementioned [1] to [21], wherein an amount of the structure derived from. Compound (Ia) in the condensate of Compound (I) is 100 mol per 100 mol of all structures derived from Compound (I).

[30] The gel of any one of the aforementioned [1] to [29], wherein the total, amount of the $—N(R^2)$ $(R^3)$ group and the $—N(R^{12})(R^{13})$ group is 0.1-5 mol relative to a total of 1 mol of the acidic dissociative group, the acidic dissociative group in a salt form, and the derivative group of the acidic dissociative group in the crosslinked polymer.

[31] The gel of any one of the aforementioned [1] to [29], wherein the total amount of the $—N(R^2)$ $(R^3)$ group and the $—N(R^{12})$ $(R^{13})$ group is 0.3-4 mol relative to a total of 1 mol of the acidic dissociative group, the acidic dissociative group 10 in a salt form, and the derivative group of the acidic dissociative group in the crosslinked polymer.

[32] The gel of any one of the aforementioned [1] to [29], wherein the total amount of the $—N(R^2)$ $(R^3)$ group and the $—N(R^{12})(R^{13})$ group is 0.5-4 mol relative to a total of 1 mol of the acidic dissociative group, the acidic dissociative group in a salt form, and the derivative group of the acidic dissociative group in the crosslinked polymer.

[33] The gel of any one of the aforementioned [1] to [32], wherein the crosslinked polymer is a hydrophilic crosslinked polymer.

[34] The gel of the aforementioned [33], wherein the hydrophilic crosslinked polymer is at least one selected from the group consisting of an acrylic acid-based crosslinked polymer, an acrylamide-based crosslinked polymer, a vinyl alcohol-based crosslinked polymer, an ethylene oxide-based crosslinked polymer, a sulfonic acid-based crosslinked polymer, an aspartic acid-based crosslinked polymer, a glutamic acid-based crosslinked polymer, an alginates-based crosslinked polymer, a starch-based crosslinked polymer and a cellulose-based crosslinked polymer.

[35] The gel of any one of the aforementioned [1] to [32], wherein the crosslinked polymer is an acrylic acid-based crosslinked polymer having at least one selected from the group consisting of a carboxy group, a carboxy group in a salt form, and a derivative group of a carboxy group.

[36] The gel of the aforementioned [35], wherein the at least one selected from the group consisting of a carboxy group, a carboxy group in a salt form, and a derivative group of a carboxy group is at least one selected from the group consisting of a carboxy group, a carboxy group in an alkali metal salt form, and a $C_{1-6}$ alkoxy-carbonyl group.

[37] The gel of the aforementioned [35], wherein the at least lo one selected from the group consisting of a carboxy group, a carboxy group in a salt form, and a derivative group of a carboxy group is at least one selected from the group consisting of a carboxy group and a carboxy group in an alkali metal salt form.

[38] The gel of any one of the aforementioned [35] to [37], wherein the acrylic acid-based crosslinked polymer comprises a constitutional unit derived from at least one kind selected from the group consisting of methacrylic acid, maleic acid, fumaric acid, crotonic acid and salts thereof, vinyl alcohol, acrylamide and methacrylamide.

[39] The gel of the aforementioned [38], wherein the constitutional units are derived from at least one kind selected from the group consisting of methacrylic acid, maleic 25 acid, fumaric acid, crotonic acid and salts thereof, and vinyl alcohol.

[40] The gel of any one of the aforementioned [1] to [32], wherein the crosslinked polymer is a crosslinked polyacrylic acid having at least one selected from the group consisting of a carboxy group and a carboxy group in a salt form.

[41] The gel of any one of the aforementioned [1] to [32], wherein the crosslinked polymer is a crosslinked polyacrylic acid having at least one selected from the group consisting of a carboxy group and a carboxy group in an alkali metal salt form.

[42] The gel of any one of the aforementioned [1] to [41], wherein a 0.2 wt % aqueous solution of the crosslinked polymer has a viscosity of 500-50,000 mPa·s.

[43] The gel of any one of the aforementioned [1] to [41], wherein a 0.2 wt % aqueous solution of the crosslinked polymer has a viscosity of 800-45,000 mPa·s.

[44] The gel of any one of the aforementioned [1] to [41], wherein a 0.2 wt % aqueous solution of the crosslinked polymer has a viscosity of 1,000-40,000 mPa·s.

[45] The gel of any one of the aforementioned [1] to [44], wherein an amount of the crosslinked polymer is 1-60% by weight of a solid content of the gel.

[46] The gel of any one of the aforementioned [1] to [44], wherein an amount of the crosslinked polymer is 3-50% by weight of a solid content of the gel.

[47] The gel of any one of the aforementioned [1] to [44], wherein an amount of the crosslinked polymer is 4-50% by weight of a solid content of the gel.

[48] The gel of any one of the aforementioned [1] to [44], wherein an amount of the crosslinked polymer is 4-40% by weight of a solid content of the gel.

[49] The gel of any one of the aforementioned [1] to [44], wherein an amount of the crosslinked polymer is 5-40% by weight of a solid content of the gel.

[50] The gel of any one of the aforementioned [1] to [44], wherein an amount of the crosslinked polymer is 6-40% by 30 weight of a solid content of the gel.

[51] The gel of any one of the aforementioned [1] to [44], wherein an amount of the crosslinked polymer is 7-40% by weight of a solid content of the gel.

[52] The gel of any one of the aforementioned [1] to [51], wherein the crosslinked polymer and the condensate of the compound represented by the formula (I) form an interpenetrating network.

[53] The gel of any one of the aforementioned. [1] to [52], further comprising a noncrosslinked polymer comprising at least one selected from the group consisting of an acidic dissociative group, an acidic dissociative group in a salt form, and a derivative group of an acidic dissociative group.

[54] The gel of the aforementioned [53], wherein the noncrosslinked polymer is a hydrophilic polymer comprising at least one selected from the group consisting of an acidic dissociative group, an acidic dissociative group in a salt form, and a derivative group of an acidic dissociative group.

[55] The gel of the aforementioned [54], wherein the hydrophilic polymer is at least one selected from the group consisting of an acrylic acid-based polymer, an acrylamide-based polymer, a vinyl alcohol-based polymer and an ethylene oxide-based polymer.

[56] The gel of the aforementioned [53], wherein the noncrosslinked polymer is an acrylic acid-based polymer comprising at least one selected from the group consisting of a carboxy group, a carboxy group in a salt form, and a derivative group of a carboxy group.

[57] The gel of the aforementioned [56], wherein the at least one selected from the group consisting of a carboxy group, a carboxy group in a salt form, and a derivative group of a carboxy group is at least one selected from the group consisting of a carboxy group, a carboxy group in an alkali metal salt form, and a $C_{1-6}$ alkoxy-carbonyl group.

[58] The gel of the aforementioned [56], wherein the at least one selected from the group consisting of a carboxy group, a carboxy group in a salt form, and a derivative group of a carboxy group is at least one selected from the group consisting of a carboxy group and a carboxy group in an alkali metal salt form.

[59] The gel of any one of the aforementioned [53] to [58], wherein a 0.2 wt % aqueous solution of the noncrosslinked polymer has a viscosity of 100-1,500 mPa·s.

[60] The gel of any one of the aforementioned [53] to [58], wherein a 0.2 wt % aqueous solution of the noncrosslinked polymer has a viscosity of 150-1,200 mPa·s.

[61] The gel of any one of the aforementioned [53] to [58], wherein a 0.2 wt % aqueous solution of the noncrosslinked polymer has a viscosity of 200-1,000 mPa·s.

[62] The gel of any one of the aforementioned [53] to [61], is wherein an amount of the noncrosslinked polymer is 1-80 parts by weight per 100 parts by weight of the crosslinked polymer.

[63] The gel of any one of the aforementioned [53] to [61], wherein an amount of the noncrosslinked polymer is 1-60 parts by weight per 100 parts by weight of the crosslinked polymer.

[64] The gel of any one of the aforementioned [53] to [61], wherein an amount of the noncrosslinked polymer is 1-50 parts by weight per 100 parts by weight of the crosslinked polymer.

[65] The gel of any one of the aforementioned [1] to [64], further comprising a basic compound.

[66] The gel of the aforementioned [65], wherein the basic compound is at least one selected from the group consisting of carbonate, hydrogen carbonate and hydroxide of an alkali metal, and amine.

[67] The gel of the aforementioned [65], wherein the basic compound is at least one selected from the group consisting of carbonate, hydrogen carbonate and hydroxide of an alkali metal.

[68] The gel of the aforementioned [65], wherein the basic compound is at least one selected from the group consisting of carbonate, hydrogen carbonate and hydroxide of at least one alkali metal selected from the group consisting of Na, K, Rb and Cs.

[69] The gel of the aforementioned [65], wherein the basic compound is at least one selected from the group consisting of cesium carbonate and cesium hydroxide.

[70] The gel of any one of the aforementioned [65] to [69], wherein an amount of the basic compound is 0.1-5 mol relative to a total of 1 mol of the acidic dissociative group, the acidic dissociative group in a salt form, and the derivative group of the acidic dissociative group in the crosslinked polymer.

[71] The gel of any one of the aforementioned [65] to [69], wherein an amount of the basic compound is 0.1-4.5 mol. relative to a total of 1 mol of the acidic dissociative group, the acidic dissociative group in a salt form, and the derivative group of the acidic dissociative group in the crosslinked polymer.

[72] The gel of any one of the aforementioned [65] to [69], wherein an amount of the basic compound is 0.1-4 mol relative to a total of 1 mol of the acidic dissociative group, the acidic dissociative group in a salt form, and the derivative group of the acidic dissociative group in the crosslinked polymer.

[73] The gel of any one of the aforementioned [65] to [69], wherein an amount of the basic compound is 1-5 mol relative to a total of 1 mol of the acidic dissociative group and the derivative group of the acidic dissociative group in the crosslinked polymer.

[74] The gel of any one of the aforementioned [65] to [69], wherein an amount of the basic compound is 1-4.5 mol relative to a total of 1 mol of the acidic dissociative group and the derivative group of the acidic dissociative group in the crosslinked polymer.

[75] The gel of any one of the aforementioned [65] to [69], wherein an amount of the basic compound is 1-4 mol relative to a total of 1 mol of the acidic dissociative group and the derivative group of the acidic dissociative group in the crosslinked polymer.

[76] The gel of any one of the aforementioned [1] to [75], further comprising water.

[77] The gel of the aforementioned [76], wherein the content of water in the gel is 1-99.9% by weight.

[78] The gel of the aforementioned [76], wherein the content of water in the gel is 3-99. 9% by weight.

[79] The gel of the aforementioned [76], wherein the content of water in the gel is 3-99% by weight.

[80] The gel of the aforementioned [76], wherein the content of water in the gel is 5-98% by weight.

[81] An acidic gas separation membrane comprising the gel of any one of the aforementioned [1] to [75].

[82] The acidic gas separation membrane of the aforementioned [81], wherein the gel in the acidic gas separation membrane further comprises water.

[83] The acidic gas separation membrane of the aforementioned [82], wherein the content of water in the gel is 5-80% by weight.

[84] The acidic gas separation membrane of the aforementioned [82], wherein the content of water in the gel is 5-70% by weight.

[85] The acidic gas separation membrane of the aforementioned [82], wherein the content of water in the gel is 8-70% by weight.

[86] The acidic gas separation membrane of the aforementioned [82], wherein the content of water in the gel is 10-60% by weight.

[87] The acidic gas separation membrane of any one of the aforementioned [81] to [86], wherein the gel is a gel membrane.

[88] The acidic gas separation membrane of the aforementioned [87], wherein the gel membrane has a thickness of 0.1-600 μm.

[89] The acidic gas separation membrane of the aforementioned [87], wherein the gel membrane has a thickness of 0.5-400 μm.

[90] The acidic gas separation membrane of the aforementioned [87], wherein the gel membrane has a thickness of 1-200 μm.

[91] The acidic gas separation membrane of any one of the aforementioned [81] to [90], further comprising a porous membrane.

[92] The acidic gas separation membrane of the aforementioned. [91], wherein the porous membrane is a fluororesin porous membrane.

[93] The acidic gas separation membrane of the aforementioned [91], wherein the porous membrane is a tetrafluoroethylene copolymer porous membrane.

[94] The acidic gas separation membrane of any one of the aforementioned [91] to [93], wherein the porous membrane has a thickness of 10-3,000 μm.

[95] The acidic gas separation membrane of any one of the aforementioned [91] to [93], wherein the porous membrane has a thickness of 10-500 μm.

[96] The acidic gas separation membrane of any one of the aforementioned [91] to [93], wherein the porous membrane has a thickness of 15-150 μm.

[97] The acidic gas separation membrane of any one of the aforementioned [91] to [96], wherein the porous membrane has a porosity of not less than 50% by volume.

[98] The acidic gas separation membrane of any one of the aforementioned [91] to [96], wherein the porous membrane has a porosity of not less than 55% by volume.

[99] The acidic gas separation membrane of any one of the aforementioned [91] to [98], wherein the porous membrane has a porosity of not more than 99% by volume.

[100] The acidic gas separation membrane of any one of the aforementioned [91] to [98], wherein the porous membrane has a porosity of not more than 95% by volume.

[101] The acidic gas separation membrane of any one of the aforementioned [91] to [100], wherein the porous membrane has a pore size of 0.005-10 μm.

[102] The acidic gas separation membrane of any one of the aforementioned [91] to [100], wherein the porous membrane has a pore size of 0.005-1 μm.

[103] An acidic gas separation apparatus comprising the acidic gas separation membrane of any one of the aforementioned [81]0 to [102].

[104] A method for separating an acidic gas, comprising contacting a mixed gas comprising at least one kind of the aforementioned acidic gas and at least one kind of nonacidic gas with the acidic gas separation membrane of any one of the aforementioned [81] to [102].

[105] The method of the aforementioned [104], wherein the acidic gas is at least one kind selected from the group consisting of carbon dioxide, hydrogen sulfide, carbonyl sulfide, sulfur oxide ($SO_x$), hydrogen cyanide, and nitrogen oxide ($NO_x$).

[106] The method of the aforementioned [104], wherein the acidic gas is at least one kind selected from the group consisting of carbon dioxide and hydrogen sulfide.

[107] The method of any one of the aforementioned [104] to [106], wherein the nonacidic gas is at least one kind selected from the group consisting of hydrogen, hydrocarbon, nitrogen, and carbon monoxide.

[108] The method of any one of the aforementioned [104] to [106], wherein the nonacidic gas is at least one kind selected from the group consisting of hydrogen, hydrocarbon and nitrogen.

[109] The method of the aforementioned [104], wherein the acidic gas is at least one kind selected from the group consisting of carbon dioxide, hydrogen sulfide, carbonyl lo sulfide, sulfur oxide ($SO_x$), hydrogen cyanide, and nitrogen oxide ($NO_x$), and the nonacidic gas is at least one kind selected from the group consisting of hydrogen, hydrocarbon, nitrogen, and carbon monoxide.

[110] The method of the aforementioned [104], wherein the acidic gas is at least one kind selected from the group consisting of carbon dioxide and hydrogen sulfide and the nonacidic gas is at least one kind selected from the group consisting of hydrogen, hydrocarbon, nitrogen, and carbon monoxide.

[111] The method of the aforementioned [104], wherein the acidic gas is at least one kind selected from the group consisting of carbon dioxide and hydrogen sulfide and the nonacidic gas is at least one kind selected from the group consisting of hydrogen, hydrocarbon and nitrogen.

[112] The method of any one of the aforementioned [104] to [111], wherein the content of the acidic gas in the mixed gas is 1 ppm-60% based on the volume.

[113] The method of any one of the aforementioned [104] to [111], wherein the content of the acidic gas in the mixed gas is 1 ppm-50% based on the volume.

[114] The method of any one of the aforementioned [104] to [113], wherein the mixed gas comprises water.

[115] The method of the aforementioned [114], wherein the mixed gas has relative humidity of 30-100% RH.

[116] The method of the aforementioned [114], wherein the mixed gas has relative humidity of 50-100% RH.

[117] The method of the aforementioned [114], wherein the mixed gas has relative humidity of 70-100% RH.

[118] A method for producing a gel comprising a crosslinked polymer having at least one selected from the group consisting of an acidic dissociative group, an acidic dissociative group in a salt form, and a derivative group of an acidic dissociative group, and a condensate of a compound represented by the following formula (I):

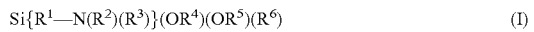

$$Si\{R^1\text{—}N(R^2)(R^3)\}(OR^4)(OR^5)(R^6) \quad (I)$$

wherein $R^1$ is an alkylene group optionally having substituent(s), a cycloalkanediyl group optionally having substituent(s), an arenediyl group optionally having substituent(s), or a divalent group optionally having substituent (s) and being a combination of at least two selected from the group consisting of an alkylene group, a cycloalkanediyl group and an arenediyl group, and one or more —CH$_2$— excluding —CH$_2$— adjacent to Si and —CH$_2$— adjacent to N in the aforementioned alkylene group and cycloalkanediyl group is/are optionally replaced by at least one selected from the group consisting of —O— and —NR$^7$— wherein R$^7$ is a hydrogen atom, an alkyl group optionally having substituent (s), a cycloalkyl group optionally having substituent(s), an aryl group optionally having substituent(s) or an aralkyl group optionally having substituent(s), $R^2$ and $R^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), $R^4$ and $R^5$ are each independently a hydrogen atom, an alkyl group optionally having substituent(s), a cycloalkyl group optionally having substituent(s), an aryl group optionally having substituent(s), or an aralkyl group optionally having substituent(s), and $R^6$ is an alkyl group optionally having substituent(s), a cycloalkyl group optionally having substituent(s), an aryl group optionally having substituent(s), an aralkyl group optionally having substituent(s), a hydroxy group, an alkoxy group optionally having substituent(s), a cycloalkyloxy group optionally having substituent(s), an aryloxy group optionally having substituent(s), an aralkyloxy group optionally having substituent(s), or a group represented by —R'$^1$—N(R'$^2$) (R'$^3$), wherein R'$^1$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —CH$_2$— excluding —CH$_2$— adjacent to Si and —CH$_2$— adjacent to N in the aforementioned alkylene group and cycloalkanediyl group is/are optionally replaced by at least one selected from the group consisting of —O— and —NR'$^7$—wherein R'$^7$ is a hydrogen atom, an alkyl group optionally having substituent (s), a cycloalkyl group optionally having substituent(s), an aryl group optionally having substituent(s) or an aralkyl group optionally having substituent(s), and R'$^2$ and R'$^3$ are each independently a hydrogen atom, an alkyl group optionally having substituent(s), a cycloalkyl group optionally having substituent(s), an aryl group optionally having substituent (s) , or an aralkyl group optionally having substituent(s), or they are bonded to each other to form, together with the adjacent nitrogen atom, a basic nitrogen-containing heterocycle optionally having substituent(s), the method comprising drying and heating a mixture comprising at least one selected from the group consisting of a compound represented by the formula (I) and a condensate of a compound represented by the formula (I), water and the aforementioned crosslinked polymer to form a condensate of the compound represented by the formula (i).

The "condensate of a compound represented by the formula (I) contained in the mixture" and the "condensate of the compound represented by the formula (I) obtained by drying and heating the mixture" in the aforementioned [118] are sometimes to be respectively described as "the first condensate of Compound (I)" and "the second condensate of Compound (I)".

[119] The method of the aforementioned [118], wherein a content of water in the mixture is not less than 10% by weight.

[120] The method of the aforementioned [118], wherein a content of water in the mixture is not less than 30% by weight.

[121] The method of any one of the aforementioned [118] to [120], wherein a content of water in the mixture is not more than 99.9% by weight. [122] The method of any one of the aforementioned [118] to [120], wherein a content of water in the mixture is not more than 95% by weight.

[123] The method of any one of the aforementioned [118] to [120], wherein a content of water in the mixture is not more than 90% by weight.

[124] The method of any one of the aforementioned. [118] to [123], wherein a content of water in the gel obtained after drying and heating is 5-60% by weight.

[125] The method of any one of the aforementioned [118] to [123], wherein a content of water in the gel obtained after drying and heating is 5-50% by weight.

[126] The method of any one of the aforementioned [118] to [123], wherein a content of water in the gel obtained after drying and heating is 8-50% by weight.

[127] The method of any one of the aforementioned [118] to [123], wherein a content of water in the gel obtained after drying and heating is 10-50% by weight.

[128] The method of any one of the aforementioned [118] to [127], wherein a heating temperature of the mixture is 50-160° C.

[129] The method of any one of the aforementioned [118] to [127], wherein a heating temperature of the mixture is 60-150° C.

[130] The method of any one of the aforementioned [118] to [129], wherein a heating time of the mixture is 10 min to 4 hr.

[131] The method of any one of the aforementioned [118] to [129], wherein a heating time of the mixture is 10 min to 2 hr.

[132] The method of any one of the aforementioned [118] to [131], wherein R$^1$ is an alkylene group optionally having substituent (s) and one or more —CH$_2$— excluding —CH$_2$— adjacent to Si and —CH$_2$— adjacent to N in the aforementioned alkylene group is/are optionally replaced by —NR$^7$— wherein R$^7$ is a hydrogen atom or an alkyl group optionally having substituent(s).

[133] The method of any one of the aforementioned [118] to [131], wherein R' is a C$_{1-10}$ alkylene group optionally having substituent(s) and one or two —CH$_2$— excluding —CH$_2$— adjacent to Si and —CH$_2$— adjacent to N in the aforementioned alkylene group is/are optionally replaced by —NR$^7$— wherein R$^7$ is a hydrogen atom or a C$_{1-6}$ alkyl group optionally having substituent(s).

[134] The method of any one of the aforementioned [118] to [131], wherein R$^1$ is a C$_{1-10}$ alkylene group and one or two —CH$_2$— excluding —CH$_2$— adjacent to Si and —CH$_2$— adjacent to N in the aforementioned alkylene group is/are optionally replaced by —NH—.

[135] The method of any one of the aforementioned [118] to [134], wherein R$^2$ and R$^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s).

[136] The method of any one of the aforementioned [118] to [134], wherein R$^2$ and R$^3$ are each independently a hydrogen atom, a alkyl group optionally having substituent(s), a C$_{6-14}$ aryl group optionally having substituent(s), or a C$_{7-16}$ aralkyl group optionally having substituent(s), or they are bonded to each other to form, together with the adjacent nitrogen atom, a basic 3- to 12-membered nitrogen-containing heterocycle optionally having substituent(s).

[137] The method of any one of the aforementioned [118] to [134], wherein R$^2$ and R$^3$ are each independently a hydrogen atom, a C$_{1-6}$ alkyl group, a phenyl group optionally having substituent(s), or a benzyl group optionally having substituent(s), or they are bonded to each other to form, together with the adjacent nitrogen atom, a basic monocyclic 4- to 8-membered nitrogen-containing heterocycle optionally having substituent(s).

[138] The method of any one of the aforementioned [118] to [137], wherein R$^4$ and R$^5$ are each independently a hydrogen atom or an alkyl group.

[139] The method of any one of the aforementioned [118] to [137], wherein R$^4$ and R$^5$ are each independently a hydrogen atom or a C$_{1-6}$ alkyl group.

[140] The method of any one of the aforementioned [118] to [137], wherein R$^4$ and R$^5$ are each independently a hydrogen atom, a methyl group, an ethyl group, a propyl group or an isopropyl group.

[141] The method of any one of the aforementioned [118] to [137], wherein R$^4$ and R$^5$ are each independently a methyl group or an ethyl group.

[142] The method of any one of the aforementioned [118] to [141], wherein R$^6$ is an alkyl group optionally having substituent(s), a hydroxy group or an alkoxy group.

[143] The method of any one of the aforementioned [118] to [141], wherein R$^6$ is a C$_{1-6}$ alkyl group optionally having substituent(s), a hydroxy group or a C$_{1-6}$ alkoxy group.

[144] The method of any one of the aforementioned [118] to [141], wherein R$^6$ is a methyl group optionally having substituent(s), a hydroxy group, a methoxy group or an ethoxy group.

[145] The method of any one of the aforementioned [118] to [131], wherein R$^1$ is an alkylene group optionally having substituent(s), and one or more —CH$_2$— excluding —CH$_2$— adjacent to Si and —CH$_2$— adjacent to N in the aforementioned alkylene group is/are optionally replaced by —NR$^7$— wherein R$^7$ is a hydrogen atom or an alkyl group optionally having substituent(s), R$^2$ and R$^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), R$^4$ and R$^5$ are each independently a hydrogen atom or an alkyl group, and R$^6$ is an alkyl group optionally having substituent(s), a hydroxy group or an alkoxy group.

[146] The method of any one of the aforementioned [118] to [131], wherein R$^1$ is a C$_{1-10}$ alkylene group optionally having substituent(s), and one or two —CH$_2$— excluding —CH$_2$— adjacent to Si and —CH$_2$— adjacent to N in the aforementioned alkylene group is/are optionally replaced by —NR$^7$— wherein R$^7$ is a hydrogen atom or a C$_{1-6}$ alkyl group optionally having substituent(s), R$^2$ and R$^3$ are each independently a hydrogen atom, a C$_{1-6}$ alkyl group optionally having substituent(s), a C$_{6-14}$ aryl group optionally having substituent(s), or a C$_{7-16}$ aralkyl group optionally having substituent(s), or they are bonded to each other to form, together with the adjacent nitrogen atom, a basic 3- to 12-membered nitrogen-containing heterocycle optionally having substituent(s), R$^4$ and R$^5$ are each independently a hydrogen atom or a C$_{1-6}$ alkyl group, and R$^6$ is a C$_{1-6}$ alkyl group optionally having substituent(s), a hydroxy group or a C$_{1-6}$ alkoxy group.

[147] The method of any one of the aforementioned [118] to [131], wherein R$^1$ is a C$_{1-10}$ alkylene group, and one or two —CH$_2$— excluding —CH$_2$— adjacent to Si and —CH$_2$— adjacent to N in the aforementioned alkylene group is/are optionally replaced by —NH—, R$^2$ and R$^3$ are each independently a hydrogen atom, a C$_{1-6}$ alkyl group, a phenyl group optionally having substituent(s), or a benzyl group optionally having substituent(s), or they are bonded to each other to form, together with the adjacent nitrogen atom, a basic monocyclic 4- to 8-membered nitrogen-containing heterocycle optionally having substituent(s), R$^4$ and R$^5$ are each independently a hydrogen atom, a methyl group or an ethyl group, and R$^6$ is a methyl group optionally having substituent(s), a hydroxy group, a methoxy group or an ethoxy group.

[148] The method of any one of the aforementioned [118] to [131], wherein Compound (I) is at least one selected from the group consisting of 3-aminopropyltrimethoxysilane, 3-aminopropyltriethoxysilane, 3-(dimethylamino)propyltrimethoxysilane, 3-(dimethylamino)propyltriethoxysilane, N-phenyl-3-aminopropyltrimethoxysilane, N-phenyl-3-aminopropyltriethoxysilane, 3-piperazinopropyltrimethoxysilane, 3-piperazinopropyltriethoxysilane, 4-aminobutyltrimethoxysilane, 4-aminobutyltriethoxysilane, 4-aminophenyltrimethoxysilane, 4-aminophenyltriethoxysilane, 3-aminopropylmethyldimethoxysilane, 3-aminopropylmethyldiethoxysilane, 3-(2-aminoethylamino)propyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-trimethoxysilyl-N-(1,3-dimethylbutylidene)propylamine, 3-(dimethylamino)propylmethyldimethoxysilane, and 3-[2-(2-aminoethylamino)ethylamino]propyltrimethoxysilane.

[149] The method of any one of the aforementioned [118] to [131], wherein Compound (I) is at least one selected from the group consisting of 3-aminopropyltrimethoxysilane, 3-(dimethylamino)propyltrimethoxysilane, 3-piperazinopropyltrimethoxysilane, 3-(dimethylamino)propylmethyldimethoxysilane, and 3-(2-aminoethylamino)propyltrimethoxysilane.

[150] The method of any one of the aforementioned [118] to [131], wherein Compound (I) is 3-aminopropyltrimethoxysilane, 3-(dimethylamino)propyltrimethoxysilane, 3-piperazinopropyltrimethoxysilane or 3-(2-aminoethylamino)propyltrimethoxysilane, or a combination of 3-aminopropyltrimethoxysilane, 3-(dimethylamino)propyltrimethpxysilane, 3-piperazinopropyltrimethoxysilane or 3-(2-aminoethylamino)propyltrimethoxysilane and 3-(dimethylamino)propylmethyldimethoxysilane.

[151] The method of any one of the aforementioned [118] to [131], wherein Compound (I) is 3-(dimethylamino)propyltrimethoxysilane.

[152] The method of any one of the aforementioned [118] to [151], wherein a total amount of Compound (Ia) contained in the mixture and a structure derived from Compound (Ia) in the first condensate of Compound (I) is 1-100 mol relative to a total of 100 mol of all Compound (I) contained in the mixture and all structures derived from Compound (I) in the first condensate of Compound (I).

[153] The method of any one of the aforementioned [118] to [151], wherein a total amount of Compound (Ia) contained in the mixture and a structure derived from Compound (Ia) in the first condensate of Compound (I) is 3-100 mol relative to a total of 100 mol of all Compound (I) contained in the mixture and all structures derived from Compound (I) in the first condensate of Compound (I).

[154] The method of any one of the aforementioned [118] to [151], wherein a total amount of Compound (Ia) contained in the mixture and a structure derived from Compound (Ia) in the first condensate of Compound (I) is 5-100 mol relative to a total of 100 mol of all Compound (I) contained in the mixture and all so structures derived from Compound (I) in the first condensate of Compound (I).

[155] The method of any one of the aforementioned [118] to [151], wherein a total amount of Compound (Ia) contained in the mixture and a structure derived from Compound (Ia) in the first. condensate of Compound (I) is 10-100 mol relative to a total of 100 mol of all Compound (I) contained in the mixture and all structures derived from Compound (I) in the first condensate of Compound (I).

[156] The method of any one of the aforementioned [118] to [151], wherein a total amount of Compound (Ia) contained in the mixture and a structure derived from Compound (Ia) in the first condensate of Compound (I) is 20-100 mol relative to a total of 100 mol of all Compound (I) contained in the mixture and all structures derived from Compound (I) in the first condensate of Compound (I).

[157] The method of any one of the aforementioned [118] to [151], wherein a total amount of Compound (Ia) contained in the mixture and a structure derived from Compound (Ia) in the first condensate of Compound (I) is 50-100 mol relative to a total of 100 mol of all Compound (I) contained in the mixture and all structures derived from Compound (I) in the first condensate of Compound (I).

[158] The method of any one of the aforementioned [118] to [151], wherein a total amount of Compound (Ia) contained in the mixture and a structure derived from Compound (Ia) in the first condensate of Compound (I) is 70-100 mol relative to a total of 100 mol of all Compound (I) contained in the mixture and all structures derived from Compound (I) in the first condensate of Compound (I).

[159] The method of any one of the aforementioned [118] to [151], wherein a total amount of Compound (Ia) contained in the mixture and a structure derived from Compound (Ia) in the first condensate of Compound (I) is 100 mol relative to a total of 100 mol of all Compound (I) contained in the mixture and all structures derived from Compound (I) in the first condensate of Compound (I)

[160] The method of any one of the aforementioned [118] to [159], wherein the total amount of the $-N(R^2)(R^3)$ group and the $-N(R'^2)(R'^3)$ group is 0.1-5 mol relative to a total of 1 mol of the acidic dissociative group, the acidic dissociative group in a salt form, and the derivative group of the acidic dissociative group in the crosslinked polymer.

[161] The method of any one of the aforementioned [118] to [159], wherein the total amount of the $-N(R^2)(R^3)$ group and the $-N(R'^2)(R'^3)$ group is 0.3-4 mol relative to a total of 1 mol of the acidic dissociative group, the acidic dissociative group in a salt form, and the derivative group of the acidic dissociative group in the crosslinked polymer.

[162] The method of any one of the aforementioned [118] to [159], wherein the total amount of the $-N(R^2)(R^3)$ group and the $-N(R'^2)(R'^3)$ group is 0.5-4 mol relative to a total of 1 mol of the acidic dissociative group, the acidic dissociative group in a salt form, and the derivative group of the acidic dissociative group in the crosslinked polymer.

[163] The method of any one of the aforementioned [118] to [162], wherein the crosslinked polymer is a hydrophilic crosslinked polymer.

[164] The method of the aforementioned. [163], wherein the hydrophilic crosslinked polymer is at least one selected from the group consisting of an acrylic acid-based crosslinked polymer, an acrylamide-based crosslinked polymer, a vinyl alcohol-based crosslinked polymer, an ethylene oxide-based crosslinked polymer, a sulfonic acid-based crosslinked polymer, an aspartic acid-based crosslinked polymer, a glutamic acid-based crosslinked polymer, an alginates-based crosslinked polymer, a starch-based crosslinked polymer and a cellulose-based crosslinked polymer.

[165] The method of any one of the aforementioned [118] to [162], wherein the crosslinked polymer is an acrylic acid-based crosslinked polymer having at least one selected from the group consisting of a carboxy group, a carboxy group in a salt form, and a derivative group of a carboxy group.

[166] The method of the aforementioned [165], wherein the at least one selected from the group consisting of a carboxy group, a carboxy group in a salt form, and a derivative group of a carboxy group is at least one selected from the group consisting of a carboxy group, a carboxy group in an alkali metal salt form, and $C_{1-6}$ alkoxy-carbonyl group.

[167] The method of the aforementioned [165], wherein the at least one selected from the group consisting of a carboxy group, a carboxy group in a salt form, and a derivative group of a lo carboxy group is at least one selected from the group consisting of a carboxy group and a carboxy group in an alkali metal salt form.

[168] The method of any one of the aforementioned [165] to [167], wherein the acrylic acid-based crosslinked polymer comprises a constitutional unit derived from at least one kind selected from the group consisting of methacrylic acid, maleic acid, fumaric acid, crotonic acid and salts thereof, vinyl alcohol, acrylamide and methacrylamide.

[169] The method of the aforementioned [166], wherein the constitutional units are derived from at least one kind selected from the group consisting of methacrylic acid, maleic acid, fumaric acid, crotonic acid and salts thereof, and vinyl alcohol.

[170] The method of any one of the aforementioned [118] to [162], wherein the crosslinked polymer is a crosslinked polyacrylic acid having at least one selected from the group consisting of a carboxy group and a carboxy group in a salt form.

[171] The method of any one of the aforementioned [118] to [162], wherein the crosslinked polymer is a crosslinked polyacrylic acid having at least one selected from the group consisting of a carboxy group and a carboxy group in an alkali metal salt form.

[172] The method of any one of the aforementioned [118] to [171], wherein a 0.2 wt % aqueous solution of the crosslinked polymer has a viscosity of 500-50,000 mPa·s.

[173] The method of any one of the aforementioned [118] to [171], wherein a 0.2 wt % aqueous solution of the crosslinked polymer has a viscosity of 800-45,000 mPa·s.

[174] The method of any one of the aforementioned [118] to [171], wherein a 0.2 wt % aqueous solution of the crosslinked polymer has a viscosity of 1,000-40,000 mPa·s.

[175] The method of any one of the aforementioned [118] to [174], wherein an amount of the crosslinked polymer is 1-60% by weight of a solid content of the gel to be produced.

[176] The method of any one of the aforementioned [118] to [174], wherein an amount of the crosslinked polymer is 3-50% by weight of a solid content of the gel to be produced.

[177] The method of any one of the aforementioned [118] to [174], wherein an amount of the crosslinked polymer is 4-50% by weight of a solid content of the gel to be produced.

[178] The method of any one of the aforementioned [118] to [174], wherein an amount of the crosslinked polymer is 4-40% by weight of a solid content of the gel to be produced.

[179] The method of any one of the aforementioned [118] to [174], wherein an amount of the crosslinked polymer is 5-40% by weight of a solid content of the gel to be produced.

[180] method of any one of the aforementioned [118] to [174], wherein an amount of the crosslinked polymer is 6-40% by weight of a solid content of the gel to be produced.

[181] The method of any one of the aforementioned [118] to [174], wherein an amount of the crosslinked polymer is 7-40% by weight of a solid content of the gel to be produced.

[182] The method of any one of the aforementioned [118] to [181], wherein at least one selected from the group consisting of Compound (I) and the first condensate of Compound (I) is Compound (I).

Effect of the Invention

Using the gel of the present invention for an acidic gas separation membrane, elution of an acidic gas carrier can be suppressed during separation of the acidic gas.

BRIEF DESCRIPTION OF THE DRAWINGS

FIG. 1 is a schematic drawing of the apparatus used for evaluation of the gas separation performance of the gas separation membranes obtained in the Examples and Comparative Examples.

DESCRIPTION OF EMBODIMENTS

Definition

The definitions of the groups and the like in the present specification are explained in order.

"$C_{x-y}$" means that the carbon number is not less than x and not more than y (x and y show numbers).

Examples of the alkali metal include lithium, sodium, potassium, rubidium and cesium. Of these, potassium, rubidium or cesium is preferable, and potassium or cesium is more preferable.

Examples of the halogen atom include fluorine atom, chlorine atom, bromine atom and iodine atom.

The alkyl group may be either linear or branched chain. The carbon number of the alkyl group is preferably 1-30, more preferably 1-20, further preferably 1-10, particularly preferably 1-6. Examples of the alkyl group include methyl group, ethyl group, propyl group, isopropyl group, butyl group, isobutyl group, sec-butyl group, tort-butyl group, pentyl group, isopentyl group, neopentyl group, 1-ethylpropyl group, hexyl group, isohexyl group, 1,1-dimethylbutyl group, 2,2-dimethylbutyl group, 3, 3-dimethylbutyl group and 2-ethylbutyl group. The alkyl group optionally has substituent(s). Examples of the substituent thereof include halogen atom, hydroxy group and amino group optionally having substituent(s).

The alkenyl group may be either linear or branched chain. The carbon number of the alkenyl group is preferably 2-30, more preferably 2-20, further preferably 2-10, particularly preferably 2-6. Examples of the alkenyl group include ethenyl group (i.e., vinyl group), 1-propenyl group, 2-propenyl group, 2-methyl-1-propenyl group, 1-butenyl group, 2-butenyl group, 3-butenyl group, 3-methyl-2-butenyl group, 1-pentenyl group, 2-pentenyl group, 3-pentenyl group, 4-pentenyl group, 4-methyl-3-pentenyl group, 1-hexenyl group, 3-hexenyl group and 5-hexenyl group. The alkenyl group optionally has substituent(s). Examples of the substituent thereof include halogen atom, hydroxy group and amino group optionally having substituent(s).

The alkynyl group may be either linear or branched chain. The carbon number of the alkynyl group is preferably 2-30, more preferably 2-20, further preferably 2-10, particularly preferably 2-6. Examples of the alkynyl group include ethynyl group, 1-propynyl group, 2-propynyl group, 1-butynyl group, 2-butynyl group, 3-butynyl group, 1-pentynyl group, 2-pentynyl group, 3-pentynyl group, 4-pentynyl group, 1-hexynyl group, 2-hexynyl group, 3-hexynyl group, 4-hexynyl group, 5-hexyhyl group and 4-methyl-2-pentynyl group. The alkynyl group optionally has substituent(s). Examples of the substituent thereof include halogen atom, hydroxy group and amino group optionally having substituent(s).

The carbon number of the cycloalkyl group is preferably 3-30, more preferably 3-20, particularly preferably 3-10. Examples of the cycloalkyl group include cyclopropyl group, cyclobutyl group, cyclopentyl group, cyclohexyl group, cycloheptyl group, cyclooatyl group, bicyclo[2.2.1]heptyl group, bicyclo[2.2.2]octyl group, bicyclo[3.2.1]octyl group and adamantyl group. The cycloalkyl group optionally has substituent(s). Examples of the substituent thereof include halogen atom, hydroxy group, alkyl group optionally having substituent(s), alkenyl group optionally having substituent(s), alkynyl group optionally having substituent(s) and amino group optionally having substituent(s).

The carbon number of the aryl group is preferably 6-18, more preferably 6-14. Examples of the aryl group include phenyl group, 2-naphthyl group, 2-naphthyl group, 1-anthryl group, 2-anthryl group and 9-anthryl group. The aryl group optionally has substituent(s). Examples of the substituent thereof include halogen atom, hydroxy group, alkyl group optionally having substituent(s), alkenyl group optionally having substituent(s), alkynyl group optionally haying substituent(s) and amino group optionally having substituent(s).

The carbon number of the aralkyl group is preferably 7-16. Examples of the aralkyl group include benzyl group, phenethyl group, naphthylmethyl group and phenylpropyl group. The aralkyl group optionally has substituent(s). Examples of the substituent thereof include halogen atom, hydroxy group, alkyl group optionally having substituent(s), alkenyl group optionally having substituent(s), alkynyl group optionally having substituent(s) and amino group optionally having substituent(s).

The alkylene group may be either linear or branched chain. The carbon number of the alkylene group is preferably 1-30, more preferably 1-20, further preferably 1-10, particularly preferably 1-6. Examples of the alkylene group include —$CH_2$—, —$(CH_2)_2$—, —$(CH_2)_3$—, —$(CH_2)_4$—, —$(CH_2)_5$—, —$(CH_2)_6$—, —$CH(CH_3)$—, —$C(CH_3)_2$—, —$CH(C_2H_5)$—, —$CH(C_3H_7)$—, —$CH(CH(CH_3)_2)$—, —$(CH(CH_3))_2$—, —$CH_2$—CH $(CH_3)$—, —$CH(CH_3)$—$CH_2$—, —$CH_2$—$CH_2$—$C(CH_3)_2$—, —$C(CH_3)_2$—$CH_2$—$CH_2$—, —$CH_2$—$CH_2$—$CH_2$—$C(CH_3)_2$— and —$C(CH_3)_2$—$CH_2$—$CH_2$—$CH_2$—. The alkylene group optionally has substituent(s). Examples of the substituent thereof include halogen atom, hydroxy group and amino group optionally having substituent(s).

The carbon number of the cycloalkanediyl group is preferably 3-30, more preferably 3-20, particularly preferably 3-10. Examples of the cycloalkanediyl group include cyclopropanediyl group, cyclobutanediyl group (e.g., cyclobutane-1,3-diyl group), cyclopentanediyl group (e.g., cyclopentane-1,3-diyl group), cyclohexanediyl group (e.g., cyclohexane-1,4-diyl group) and cycloheptanediyl group (e.g., cycloheptane-1,4-diyl group). The cycloalkanediyl group optionally has substituent(s). Examples of the substituent thereof include halogen atom, hydroxy group, alkyl group optionally having substituent(s), alkenyl group optionally having substituent(s), alkynyl group optionally having substituent(s) and amino group optionally having substituent(s).

The carbon number of the arenediyl group is preferably 6-18, more preferably 6-14. Examples of the arenediyl group include benzenediyl group (e.g., benzene-1,4-diyl group), naphthalenediyl group (e.g., naphthalene-1,4-diyl group), phenanthrenediyl group (e.g., phenanthrene-1, 6-diyl group) and anthracenediyl group (e.g., anthracene-2,6-diyl group). The arenediyl group optionally has substituent(s). Examples of the substituent thereof include halogen atom, hydroxy group, alkyl group optionally having substituent(s), alkenyl group optionally having substituent(s), alkenyl group optionally having substituent(s) and amino group optionally having substituent(s).

Examples of the divalent group being a combination of at least two selected from the group consisting of alkylene group, cycloalkanediyl group and arenediyl group include a group wherein —$CH_2$— and a cyclohexanediyl group are bonded, a group wherein —$CH_2$—, a cyclohexanediyl group and —$CH_2$— are bonded, a group wherein —$CH_2$— and a benzenediyl group are bonded, and a group wherein —$CH_2$— a benzenediyl group and —$CH_2$— are bonded. The divalent group optionally has substituent(s). Examples of the substituent thereof include halogen atom, hydroxy group and. lo amino group optionally having substituent(s).

The explanation of an alkyl group being one part of the alkoxy group (i.e., alkyloxy group) is as mentioned above. Preferable examples of the alkoxy group include methoxy group, ethoxy group, propoxy group, isopropoxy group, butoxy group, isobutoxy group, sec-butoxy group, tert-butoxy group, pentyloxy group and hexyloxy group. The alkoxy group optionally has substituent(s). Examples of the substituent thereof include halogen atom, hydroxy group and amino group optionally having substituent(s).

The explanation of a cycloalkyl group being one part of the cycloalkyloxy group is as mentioned above. Preferable examples of the cycloalkyloxy group include cyclopropyloxy group, cyclobutyloxy group, cyclopentyloxy group, cyclohexyloxy group, cycloheptyloxy group and cyclooctyloxy group. The cycloalkyloxy group optionally has substituent(s). Examples of the substituent thereof include halogen atom, hydroxy group, alkyl group optionally having substituent(s), alkenyl group optionally having substituent(s), alkynyl group optionally having substituent(s), amino group optionally having substituent(s).

The explanation of an aryl group being one part of the aryloxy group is as mentioned above. Preferable examples of the aryloxy group include phenyloxy group, 1-naphthyloxy group and 2-naphthyloxy group. The aryloxy group optionally has substituent(s). Examples of the substituent thereof include halogen atom, hydroxy group, alkyl group optionally having substituent(s), alkenyl group optionally having substituent(s), alkynyl group optionally having substituent(s) and amino group optionally having substituent(s).

The explanation of an aralkyl group being one part of the aralkyloxy group is as mentioned above. Preferable examples of the aralkyloxy group include benzyloxy group, phenethyloxy group, naphthylmethyloxy group and phenylpropyloxy group. The aralkyloxy group optionally has substituent(s). Examples of the substituent thereof include halogen atom, hydroxy group, alkyl group optionally having substituent(s), alkenyl group optionally having substituent(s), alkynyl group optionally having substituent (s) and amino group optionally having substituent(s).

Preferable examples of the alkoxy-carbonyl group include methoxycarbonyl group, ethoxycarbonyl group, propoxycarbonyl group, isopropoxycarbonyl group, butoxycarbonyl group, isobutoxycarbonyl group, sec-butoxycarbonyl group, tert-butoxycarbonyl group, pentyloxycarbonyl group and hexyloxycarbonyl group. The alkoxy-carbonyl group optionally has substituent(s), Examples of the substituent thereof include halogen atom, hydroxy group and amino group optionally having substituent(s).

Examples of the amino group optionally having substituent (s) include amino group, mono- or di-alkylamino group (e.g., methylamino group, dimethylamino group, ethylamino group, diethylamino group, propylamino group, dibutylamino group), mono- or di-cycloalkylamino group (e.g., cyclopropylamino group, cyclohexylamino group), mono- or di-arylamino group (e.g., phenylamino group), mono- or di-aralkylamino group (e.g., benzylamino group, dibenzylamino group) and (heterocycle)amino group (e.g., pyridylamino group).

Preferable examples of the optionally substituted amino group include amino group and mono- or di-alkylamino group (e.g., methylamino group, dimethylamino group, ethylamino group, diethylamino group, propylamino group, dibutylamino group). It is more preferably amino group, methylamino group or dimethylamino group.

While the basic nitrogen-containing heterocycle may be either monocycle or a fused ring, it is preferably monocycle. The number of the ring-constituting atom of the basic nitrogen containing heterocycle is preferably 3-12, more preferably 4-8. The basic nitrogen-containing heterocycle may contain plural nitrogen atoms, and may also contain hetero atom (e.g., oxygen atom, sulfur atom) other than nitrogen atom. Examples of the basic nitrogen-containing heterocycle include pyrrolidine ring, pyrazolidine ring, imidazolidine ring, isoxazolidine ring, isothiazolidine ring, piperidine ring, hexamethylenimine ring, piperazine ring, morpholine ring, thiomorpholine ring, 1H-imidazole ring, 1H-pyrazole ring, pyridine ring, indoline ring and isoindoline ring. The basic nitrogen-containing heterocycle optionally has substituent(s). Examples of the substituent thereof include halogen atom, hydroxy group, alkyl group optionally having substituent(s), alkenyl group optionally having substituent(s), alkynyl group optionally having substituent (s) and amino group optionally having substituent(s).

Gel

The gel of the present invention contains a crosslinked polymer having at least one selected from the group consisting of an acidic dissociative group, an acidic dissociative group in a salt form, and a derivative group of an acidic dissociative group and a condensate of a compound represented by the following formula (I).

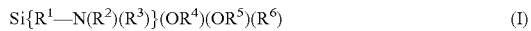

Si{R$^1$—N(R$^2$)(R$^3$)}(OR$^4$)(OR$^5$)(R$^6$)  (I)

The formula (I) shows that all of the —R$^1$—N(R$^2$)(R$^3$) group, —OR$^4$ group, —OR$^5$ group and —R$^6$ group are bonded to Si. N(R$^2$)(R$^3$) in the formula (I) shows that both the —R$^2$ group and —R$^3$ group are bonded to N. Other formulas also mean the same. In the following, "a compound represented by the formula (I)" is sometimes to be abbreviated as "Compound (I)".

Crosslinked Polymer

The crosslinked polymer to be used in the present Is invention has at least one selected from the group consisting of an acidic dissociative group, an acidic dissociative group in a salt form, and a derivative group of an acidic dissociative group. The crosslinked polymer may be only one kind, or may include two or more kinds.

The acidic dissociative group means an acidic functional group capable of releasing proton (H$^+$) in water and is, for example, a carboxy group (—COOH), a sulfo group (—S(O)$_2$(OH)), a phosphono group (—P(O)(OH)$_2$) or a phosphonooxy group (—O—P(O) (OH)$_2$).

The acidic dissociative group may be, for example, a salt form such as —COOM$^1$, —S(O)$_2$(OM$^2$), —P(O)(OM$^3$)(OM'$^1$), —O— P(O)(OM$^4$)(OM$\alpha^2$) (in the aforementioned formulas, M$^1$-M$^4$ are each independently a cation different from a proton (hereinafter sometimes to be abbreviated as "other cation"), and M'$^1$ and M'$^2$ are each a hydrogen atom (proton) or other cation) and the like. Examples of other cation include metal ion and ammonium ion. Examples of the metal ion include alkali metal ion. Other cation is preferably alkali metal ion, more preferably potassium ion or cesium ion.

Examples of the derivative group of the acidic dissociative group include a group that is hydrolyzed to form. an acidic dissociative group or an acidic dissociative group in a salt form. Examples of such group include —COOR$^{a1}$, —S(O)$_2$(OR$^{a2}$), —P(O)(OR$^{a3}$)(OR'$^{a1}$), —O—P(O) (OR$^{a4}$)(OR'$^{a2}$), —CON(R$^{a3}$)(R'$^{a4}$), —S(O)$_2$N(R$^{a5}$)(R'$^{a6}$), —P(O){N(R'$^{a7}$)(R'$^{a8}$)}{N(R'$^{a9}$)(R'$^{a10}$)}, —O—P(O){N(R'$^{a11}$)(R'$^{a12}$)}{N(R'$^{a13}$)(R'$^{a14}$)} (in the aforementioned formulas, R$^{a1}$ R$^{a4}$ are each independently an alkyl group optionally having substituent(s), a cycloalkyl group optionally having substituent (s) , an aryl group optionally having substituent(s) or an aralkyl group optionally having substituent(s), and R'$^{a1}$ R'$^{a4}$ are each independently a hydrogen atom, an alkyl group optionally having substituent(s), a cycloalkyl group optionally having substituent(s), an aryl. group optionally having substituent (s) or an aralkyl group optionally having substituent(s)).

The crosslinked polymer is preferably a hydrophilic crosslinked polymer having at least one selected from the group consisting of an acidic dissociative group, an acidic dissociative group in a salt form, and a derivative group of an acidic dissociative group. Examples of the hydrophilic crosslinked polymer include acrylic acid-based crosslinked polymer, acrylamide-based crosslinked polymer, vinyl alcohol-based crosslinked polymer, ethylene oxide-based crosslinked polymer, sulfonic acid-based crosslinked polymer, aspartic acid-based crosslinked polymer, glutamic acid-based crosslinked polymer, alginates-based crosslinked polymer, starch-based crosslinked polymer and cellulose-based crosslinked polymer. Of these, acrylic acid-based crosslinked polymer is preferable. A hydrophilic crosslinked polymer having a high degree of crosslinking and a high water absorbing power is generally known as Superabsorbent Polymer (hereinafter sometimes to be abbreviated as "SAP").

The crosslinked polymer is more preferably an acrylic acid-based crosslinked polymer having at least one selected from the group consisting of a carboxy group, a carboxy group in a salt form, and a derivative group of a carboxy group (hereinafter sometimes to be abbreviated as "carboxy group etc."). The carboxy group etc. are each preferably at least one selected from the group consisting of a carboxy group, a carboxy group in an alkali metal salt form and a $C_{1-6}$ alkoxy-carbonyl group, more preferably at least one selected from the group consisting of a carboxy group and a carboxy group in an alkali metal salt form.

An acrylic acid-based crosslinked polymer having a carboxy group etc. can be produced by, for example, polymerizing acrylic acid, acrylate and a crosslinkable monomer. Such polymerization is well known in the field of SAP and those of ordinary skill in the art can produce an acrylic acid-based crosslinked polymer having a carboxy group etc. by appropriately setting the conditions therefor.

In the present invention, the crosslinkable monomer for producing an acrylic acid-based crosslinked polymer having a carboxy group etc. is not particularly limited and, for example, one well known in the field of SAP can be used. Examples of the crosslinkable monomer include 1,3-butylene glycol di(meth)acrylate, 1,4-butanediol di(meth)acrylate, 1,6-hexanediol di(meth)acrylate, neopentylglycol di(meth)acrylate, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, trimethylolpropane tri(meth)acrylate, pentaerythritol tetra(meth)acrylate and dipentaerythritol penta(meth)acrylate.

An acrylic acid-based crosslinked polymer having a carboxy group etc. optionally further has at least one selected from the group consisting of an acidic dissociative group, an acidic dissociative group in a salt form, and a derivative group of an acidic dissociative group, which is different from the carboxy group etc. (hereinafter sometimes to be abbreviated as "other acidic dissociative group etc."). Examples of such other acidic dissociative group etc. include sulfo group, phosphono group, phosphonooxy group, sulfo group in a salt form, phosphono group in a salt form, phosphonooxy group in a salt form, a derivative group of sulfo group, a derivative group of phosphono group and a derivative group of phosphonooxy group.

The other acidic dissociative group etc. can be introduced into a crosslinked polymer by polymerizing a monomer having the group together with the aforementioned acrylic acid, acrylate and crosslinkable monomer, or adding a monomer or polymer having other acidic dissociative group etc. to the crosslinked polymer obtained by polymerization.

An acrylic acid-based crosslinked polymer having a carboxy group etc. may contain, in addition to the constitutional units derived from acrylic acid or constitutional units derived from acrylate, constitutional units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units"). The other constitutional units are preferably derived from at least one kind selected from the group consisting of methacrylic acid, maleic acid, fumaric acid, crotonic acid and salts thereof and vinyl alcohol.

In the present specification, the "constitutional unit derived from vinyl alcohol" means a unit having a structure formed by binding of a double bond of vinyl alcohol, and may not be formed from the vinyl alcohol itself. The "constitutional unit derived from vinyl alcohol" can be generally formed by polymerizing vinyl acetate and hydrolyzing a constitutional unit derived from vinyl acetate. In addition, the "constitutional unit derived from acrylic acid" and the like also mean the same. When an acrylic acid-based crosslinked polymer having a carboxy group etc. contains other constitutional units, the crosslinked polymer may be any of a random copolymer, an alternating copolymer, a block copolymer and a graft copolymer.

A crosslinked polymer is further preferably a crosslinked polyacrylic acid having at least one selected from the group consisting of a carboxy group and a carboxy group in a salt form. The crosslinked polyacrylic acid here means a crosslinked polymer composed of constitutional units derived from acrylic acid, constitutional units derived from acrylate and constitutional units derived from a crosslinkable monomer. The crosslinked polymer is particularly preferably crosslinked polyacrylic acid having at least one selected from the group consisting of a carboxy group and a carboxy group in an alkali metal salt form.

As an index of the degree of crosslinking of a crosslinked polymer, the viscosity of a 0.2 wt % aqueous solution thereof can be mentioned. From the aspects of pressure capacity, water-holding capacity and the like, the viscosity of a 0.2 wt % aqueous solution of a crosslinked polymer is preferably 500-50,000 mPa·s, more preferably 800-45,000 mPa·s, further preferably 1,000-40,000 mPa·s. The viscosity value is measured by a B-type viscometer under the conditions of pH 7, temperature 25° C. and rotating speed 20 rpm.

As the crosslinked polymer, a commercially available product can be used. Examples of the commercially available product include "SANFRESH (registered trade mark)" manufactured by Sanyo Chemical. Industries, Ltd., "AQUPEC (registered trade mark)" and "SS-gel (registered trade mark)" manufactured by Sumitomo Seika Chemicals Company Limited, a potassium salt of a crosslinked polyacrylamide-polyacrylic acid copolymer of "product number 432776" purchased from Sigma-Aldrich CO. LLC. and the like.

The amount of the crosslinked polymer is preferably 1-60% by weight, more preferably 3-50% by weight, still more preferably 4-50% by weight, further preferably 4-40% by weight, furthermore preferably 5-40% by weight, particularly preferably 6-40% by weight, most preferably 7-40% by weight, relative to the solid content of the gel. The solid content of the gel means a total of the component other than water and other volatile component (e.g., organic solvent used for gel production) (i.e., crosslinked polymer, Compound (I), and any non-volatile component).

Condensate of Compound (I)

The present invention contains a condensate of Compound (I). In the present invention, the condensate of Compound (I) contained in the gel can function as an acidic gas carrier. Using such condensate, an outflow of the condensate from the gel can be suppressed. Only one kind of the condensate of Compound (I) may be used or two or more kinds thereof may be used. In addition, only one kind of Compound (I) to be a material for the condensate may be used or two or more kinds thereof may be used. The groups contained in Compound (I) are explained in order below.

$R^1$ is an alkylene group optionally having substituent(s), a cycloalkanediyl group optionally having substituent( ) an arenediyl group optionally having substituent(s), or a divalent group optionally having substituent(s), and $R^1$ is a combination of at least two selected from the group consisting of an alkylene group, a cycloalkanediyl group and an arenediyl group, and one or more —$CH_2$— excluding —$CH_2$— adjacent to Si and —$CH_2$— adjacent to N in the aforementioned alkylene group and cycloalkanediyl group is/are optionally replaced by at least one selected from the group consisting of —O— and —$NR^7$— wherein $R^7$ is a hydrogen atom, an alkyl group optionally having substituent(s), a cycloalkyl group optionally having substituent(s), an aryl group optionally having substituent (s) or an aralkyl group optionally having substituent(s).

$R^1$ is preferably an alkylene group optionally having substituent(s), and one or more —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or an alkyl group optionally having substituent(s).

$R^1$ is more preferably a $C_{1-10}$ alkylene group optionally having substituent(s), and one or two —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or a $C_{1-6}$ alkyl group optionally having substituent(s).

$R^1$ is further preferably a alkylene group, and one or two —$CH_2$— excluding —$CH_2$— adjacent to Si and —$CH_2$— adjacent to N in the aforementioned alkylene group is/are optionally replaced by —NH—.

$R^2$ and $R^3$ are each independently a hydrogen atom, an alkyl group optionally having substituent(s), a cycloalkyl group optionally having substituent(s), an aryl group optionally having substituent(s) or an aralkyl group optionally having substituent(s), or they are bonded to each other to form, together with the adjacent nitrogen atom, a basic nitrogen-containing heterocycle optionally having substituent(s).

The basic nitrogen-containing heterocycle formed by $R^2$, $R^3$ and a nitrogen atom adjacent thereto is preferably a basic 3- to 12-membered nitrogen-containing heterocycle, more preferably a basic monocyclic 4- to 8-membered nitrogen-containing heterocycle.

$R^2$ and $R^3$ are each independently preferably a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s).

$R^2$ and $R^3$ are each independently more preferably a hydrogen atom, a $C_{1-6}$ alkyl group optionally having substituent(s), a $C_{6-14}$ aryl group optionally having substituent(s), or a $C_{7-16}$ aralkyl group optionally having substituent(s), or they are bonded to each other to form, together with the adjacent nitrogen atom, a basic 3-12-membered nitrogen-containing heterocycle optionally having substituent(s).

$R^2$ and $R^3$ are each independently further preferably a hydrogen atom, a $C_{1-6}$ alkyl group, a phenyl group optionally having substituent(s), or a benzyl group optionally having substituent(s), or they are bonded to each other Lo form, together with the adjacent nitrogen atom, a basic monocyclic 4- to 8-membered nitrogen-containing heterocycle optionally having substituent(s).

$R^4$ and $R^5$ are each independently a hydrogen atom, an alkyl group optionally having substituent(s), a cycloalkyl group optionally having substituent(s), an aryl group optionally having substituent(s), or an aralkyl group optionally having substituent(s).

$R^4$ and $R^5$ are each independently preferably a hydrogen atom or an alkyl group, more preferably a hydrogen atom or a $C_{1-6}$ alkyl group, further preferably a hydrogen atom, a methyl group, an ethyl group, a propyl group or an isopropyl group, particularly preferably a methyl group or an ethyl group.

$R^6$ is an alkyl group optionally having substituent(s), a cycloalkyl group optionally having substituent(s), an aryl group optionally having substituent(s), an aralkyl group optionally having substituent(s), a hydroxy group, an alkoxy group optionally having substituent(s), a cycloalkyloxy group optionally having substituent(s), an aryloxy group optionally having substituent(s), an aralkyloxy group optionally having substituent(s), or a group represented by —$R'^1$—$N(R'^2)(R'^3)$.

$R'^1$ is an alkylene group optionally having substituent(s), a cycloalkanediyl group optionally having substituent(s), an arenediyl group optionally having substituent(s), or a divalent group optionally having substituent(s), and the divalent group is a combination of at least two selected from the group consisting of an alkylene group, a cycloalkanediyl group or an arenediyl group, and one or more —$CH_2$— excluding —$CH_2$— adjacent to Si and —$CH_2$— adjacent to N in the aforementioned alkylene group and cycloalkanediyl group is/are optionally replaced by at least one selected from the group consisting of —O— and —$NR'^7$— wherein $R'^7$ is a hydrogen atom, an alkyl group optionally having substituent(s), a cycloalkyl group optionally having substituent(s), an aryl group optionally having substituent (s) or an aralkyl group optionally having substituent(s).

The explanations of and $R'^7$ are the same as those of the aforementioned $R^1$ and $R^7$. $R'^1$ and $R'^7$ may respectively be the same as or different from the corresponding $R^1$ and $R^7$.

$R'^2$ and $R'^3$ are each independently a hydrogen atom, an alkyl group optionally having substituent(s), a cycloalkyl group optionally having substituent (s), an aryl group optionally having substituent(s), or an aralkyl group optionally having substituent(s), or they are bonded to each other to form, together with the adjacent nitrogen atom, a is basic nitrogen-containing heterocycle optionally having substituent(s).

The explanations of $R'^2$, $R'^3$, $R'^8$ and $R'^9$ are the same as those of the aforementioned $R^2$, $R^3$, $R^8$ and $R^9$. $R'^2$, $R'^3$, $R'^8$ and $R'^9$ may respectively be the same as or different from the corresponding $R^2$, $R^3$, $R^6$ and $R^9$.

$R^6$ is preferably an alkyl group optionally having substituent(s), a hydroxy group or an alkoxy group, more preferably a alkyl group optionally having substituent(s), a hydroxy group or a $C_{1-6}$ alkoxy group, further preferably a methyl group optionally having substituent(s), a hydroxy group, a methoxy group or an ethoxy group.

In the following, "a compound represented by the formula (I) wherein $R^6$ is a hydroxy group, an alkoxy group optionally having substituent (s), a cycloalkyloxy group optionally having substituent(s), an aryloxy group optionally having substituent(s) or an aralkyloxy group optionally having substituent(s)" is abbreviated as "Compound (Ia)". In Compound (Ia), the groups other than $R^6$ (i.e., $R^1$-$R^5$) are as defined above. The condensate of Compound (I) preferably contains a structure derived from. Compound (Ia). Since —$OR^4$ group, —$OR^5$ group and —$R^6$ group of Compound (Ia) are involved in the condensation, a condensate of Compound. (I) containing a structure derived from Compound. (Ia) has a crosslinked structure. A condensate of Compound (I) having such crosslinked structure shows still more suppressed outflow from the gel.

In the condensate of Compound (I), the amount of the structure derived from Compound (Ia) is preferably 1-100 mol, more preferably 3-100 mol, still more preferably 5-100 mol, further preferably 10-100 mol, furthermore preferably 20-100 mol, particularly preferably 50-100 mol, particularly furthermore preferably 70-100 mol, most preferably 100 mol, per 100 mol of all the structures derived from Compound (I). It is most preferable that all Compound (I) should be Compound. (Ia), and all the structures of the condensates of Compound (I) should be derived from Compound (Ia).

As a preferable combination of the groups in the formula (I), the following combination can be mentioned:

$R^1$ is an alkylene group optionally having substituent(s), one or more —$CH_2$— excluding —$CH_2$— adjacent to Si and —$CH_2$— adjacent to N in the aforementioned alkylene group is/are optionally replaced by —$NR^7$— wherein $R^7$ is a hydrogen atom or an alkyl group optionally having substituent(s), $R^2$ and $R^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), $R^4$ and $R^5$ are each independently a hydrogen atom or an alkyl group, and $R^6$ is an alkyl group optionally having substituent(s), a hydroxy group or an alkoxy group.

As a more preferable combination of the groups in the formula (I), the following combination can be mentioned:

$R^1$ is a $C_{1-10}$ alkylene group optionally having substituent(s), one or two —$CH_2$— excluding —$CH_2$— adjacent to Si and —$CH_2$— adjacent to N in the aforementioned alkylene group is/are optionally replaced by —$NR^7$— wherein $R^7$ is a hydrogen atom, a $C_{1-6}$ alkyl group optionally having substituent(s), $R^2$ and $R^3$ are each independently a hydrogen atom, a $C_{1-6}$ alkyl group optionally having substituent(s), a $C_{6-14}$ aryl group optionally having substituent(s), or a $C_{7-16}$ aralkyl group optionally having substituent(s), or they are bonded to each other to form, together with the adjacent nitrogen atom, a basic 3-12-membered nitrogen-containing heterocycle optionally having substituent(s), $R^4$ and $R^5$ are each independently a hydrogen atom or a $C_{1-6}$ alkyl group, and $R^6$ is a $C_{1-6}$ alkyl group optionally having substituent(s), a hydroxy group or a $C_{1-6}$ alkoxy group.

As a further preferable combination of the groups in the formula (I), the following combination can be mentioned:

$R^1$ is a $C_{1-10}$ alkylene group, one or two —$CH_2$— excluding —$CH_2$— adjacent to Si and —$CH_2$— adjacent to N in the 30 aforementioned alkylene group is/are optionally replaced by —NH—, $R^2$ and $R^3$ are each independently a hydrogen atom, a $C_{1-6}$ alkyl group, a phenyl group optionally having substituent(s), or a benzyl group optionally having substituent (s), or they are bonded to each other to form, together with the adjacent nitrogen atom, a basic monocyclic 4- to 8-membered nitrogen-containing heterocycle optionally having substituent(s), $R^4$ and $R^5$ are each independently a hydrogen atom, a methyl group or an ethyl group, and $R^6$ is a methyl group optionally having substituent(s), a hydroxy group, a methoxy group or an ethoxy group.

Specific examples of Compound (I) include 3-aminopropyltrimethoxysilane, 3-aminopropyltriethdxysilane, 3-(dimethylamino)propyltrimethoxysilane, 3-(dimethylamino)propyltriethoxysilane, N-phenyl-3-aminopropyltrimethoxysilane, N-phenyl-3-aminopropyltriethoxysilane, 3-piperazinopropyltrimethoxysilane, 3-piperazinopropyltriethoxysilane, 4-aminobutyltrimethoxysilane, 4-aminobutyltriethoxysilane, 4-aminophenyltrimethoxysilane, 4-aminophenyltriethoxysilane, 3-aminopropylmethyldimethoxysilane, 3-aminopropylmethyldiethoxysilane, N-2-(aminoethyl)-3-aminopropyltrimethoxysilane (alias: 3-(2-aminoethylamino)propyltrimethoxysilane), N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-trimethoxysilyl-N-(1,3-dimethylbutylidene)propylamine, 3-(dimethylamino)propylmethyldimethoxysilane, 3-[2-(2-aminoethylamino)ethylamino]propyltrimethoxysilane and the like, but the present invention is not limited thereto. These specific examples are commercially available as, for example, aminosilane coupling agents.

Compound (I) is preferably at least one selected from the group consisting of 3-aminopropyltrimethoxysilane, 3-(dimethylamino)propyltrimethoxysilane, 3-piperazinopropyltrimethoxysilane, 3-(dimethylamino)propylmethyldimethoxysilane and 3-(2-aminoethylamino)propyitrimethoxysilane.

Compound (I) is more preferably 3-aminopropyltrimethoxysilane, 3-(dimethylamino)propyltrimethoxysilane, 3-piperazinopropyltrimethoxysilane or 3-(2-aminoethylamino)propyltrimethoxvsilane, or a combination of 3-aminopropyitrimethoxysilane, (dimethylamino)propyltrimethoxysilane, piperazinopropyltrimethoxysilane or 3-(2-aminoethylamino)propyltrimethoxysilane and 3-(dimethylamino)propylmethyldimethoxysilane. Compound (I) is further preferably 3-(dimethylamino)propyltrimethoxysilane.

When Compound (I) having an alkoxy group bonded to a silicon atom and the like is used, Compound (I) is hydrolyzed to form Compound (I) having a hydroxy group, and the obtained Compound (I) having a hydroxy group is condensed (dehydration condensation) to give a condensate of Compound (I). When Compound (I) having a hydroxy group bonded to a silicon atom is used, this is condensed (dehydration condensation) to give a condensate of Compound (I).

In the condensation of Compound (I), other compound different from Compound (I) may also be used in combination. That is, the condensate of Compound (I) optionally has a structure derived from other compound. The other compound may be one kind alone, or two or more kinds thereof may be used. Examples of the other compound include tetraalkoxysilane, alkoxyaluminum, alkoxytitanium and alkoxyzirconium. Of these, tetraalkoxysilane is preferable. Examples of the tetraalkoxysilane include tetramethoxysilane, tetraethoxysilane and tetraisopropoxysilane. The condensate of Compound (I) is preferably free of a structure derived from other compound (i.e., the condensate of Compound (I) is composed of a structure derived from Compound (I)).

In the condensate of Compound (I), the amount of the structure derived from other compound is preferably 0-50 mol, more preferably 0-30 mol, further preferably 0-10 mol, per 100 mol of the structure derived from Compound (I). The condensate of Compound (I) is particularly preferably free of a structure derived from other compound.

From, the aspects of suppression of the elution of a carrier, the aforementioned crosslinked polymer and the condensate of Compound (I) preferably forms an interpenetrating network in the gel of the present invention. As used herein, the "interpenetrating network" means a structure in which network structures of two or more kinds of crosslinked products form a structure by being entangled without basically interposing a covalent bond. Such structure is sometimes also called an interpenetrating polymer network. In the interpenetrating network of the gel of the present invention, however, the crosslinked polymer and the condensate of Compound (I) may form a covalent bond. A gel having an interpenetrating network shows suppressed outflow of the condensate of Compound (I), which is an acidic gas carrier. Such gel can be produced, for example, by drying and heating a mixture containing at least one selected from the group consisting of Compound (I) and a condensate of Compound (I), water and the aforementioned crosslinked polymer, as mentioned below.

The amount of the condensate of Compound (I) is determined by the total amount of $-N(R^2)(R^3)$ group and $-N(R'^2)(R'^3)$ group in the condensate per 1 mol of the total of the acidic dissociative group, the acidic dissociative group in a salt form, and the derivative group of the acidic dissociative group in the crosslinked polymer. For example, when the crosslinked polymer does not have a derivative group of the acidic dissociative group, "the total of the acidic dissociative group, the acidic dissociative group in a salt form, and the derivative group of the acidic dissociative group" means "the total of the acidic dissociative group and the acidic dissociative group in a salt form". When the condensate of Compound (I) does not have an $-N(R'^2)(R'^3)$ group, "the total amount of $-N(R^2)(R^3)$ group and $-N(R'^2)(R'^3)$ group" means the "amount of $-N(R^2)(R^3)$ group".

From the aspects of membrane permeability of the acidic gas and membrane-forming performance, the total amount of the $-N(R^2)(R^3)$ group and $-N(R'^2)(R'^3)$ group is preferably 0.1-5 mol, more preferably 0.3-4 mol, further preferably 0.5-4 mol, relative to a total of 1 mol of the acidic dissociative group, the acidic dissociative group in a salt form, and the derivative group of the acidic dissociative group in the crosslinked polymer.

Other Components

The gel of the present invention may contain other components different from the aforementioned crosslinked polymer and the condensate of Compound (I) as long as the effect of the present invention is not markedly inhibited. Only one kind of other component may be used or two or more kinds thereof may be used.

The gel of the present invention may further contain a noncrosslinked polymer having at least one selected from the group consisting of an acidic dissociative group, an acidic dissociative group in a salt form, and a derivative group of an acidic dissociative group. The noncrosslinked polymer may be only one kind, or may include two or more kinds. In the following, the noncrosslinked polymer is sometimes to be abbreviated simply as a "polymer".

The explanations of the acidic dissociative group, the acidic dissociative group in a salt form, and the derivative group of the acidic dissociative group are the same as those of the crosslinked polymer. The noncrosslinked polymer is preferably a hydrophilic polymer (noncrosslinked polymer) having at least one selected from the group consisting of an acidic dissociative group, an acidic dissociative group in a salt form, and a derivative group of an acidic dissociative group. Examples of the hydrophilic polymer include acrylic acid-based polymer, acrylamide-based polymer, vinyl alcohol-based polymer and ethylene oxide-based polymer. The hydrophilic polymer is more preferably a water-soluble polymer.

The noncrosslinked polymer is more preferably an acrylic acid-based polymer having at least one selected from the group consisting of a carboxy group, a carboxy group in a salt form, and a derivative group of a carboxy group (hereinafter sometimes to be abbreviated as "carboxy group etc."). The carboxy group etc. are each preferably at least one selected from the group consisting of a carboxy group, a carboxy group in an alkali metal salt form and a $C_{1-6}$ alkoxy-carbonyl group, more preferably at least one selected from the group consisting of a carboxy group and a carboxy group in an alkali metal salt form.

The acrylic acid-based polymer having a carboxy group etc. optionally further has at least one selected from the group consisting of an acidic dissociative group, an acidic dissociative group in a salt form, and a derivative group of an acidic dissociative group, which is different from the carboxy group etc. (hereinafter sometimes to be abbreviated as "other acidic dissociative group etc."). Examples of such other acidic dissociative group etc. include sulfa group, phosphono group, phosphonooxy group, sulfo group in a salt form, phosphono group in a salt form, phosphponooxy group in a salt form, a derivative group of sulfo group, a derivative group of phosphono group and a derivative group of phosphonooxy group, The other acidic dissociative group etc. can be introduced into an acrylic acid-based polymer by polymerizing a monomer having the group together with the aforementioned acrylic acid and/or acrylate, or adding a monomer or polymer having other acidic dissociative group etc. to the obtained acrylic acid-based polymer.

An acrylic acid-based polymer having a carboxy group etc. may contain, in addition to the constitutional units derived from acrylic acid or constitutional units derived from salt of acrylic acid, constitutional units derived from at least one kind selected from the group consisting of methacrylic acid, maleic acid, fumaric acid, crotonic acid and salts thereof, vinyl alcohol, acrylamide, and methacrylamide (hereinafter sometimes to be abbreviated as "other constitutional units"). The other constitutional units are preferably derived from at least one kind selected from, the group consisting of methacrylic acid, maleic acid, fumaric acid, crotonic acid and. salts thereof and vinyl alcohol. When an acrylic acid-based polymer having a carboxy group etc. contains other constitutional units, the polymer may be any of a random copolymer, an alternating copolymer, a block copolymer and a graft copolymer.

A noncrosslinked polymer is further preferably a noncrosslinked polyacrylic acid having at least one selected from the group consisting of a carboxy group and a carboxy group in a salt form. The noncrosslinked polyacrylic acid here means a noncrosslinked polymer composed of constitutional units derived from acrylic acid and constitutional units derived from salt of acrylic acid. The noncrosslinked polymer is particularly preferably noncrosslinked polyacrylic acid having at least one selected from the group consisting of a carboxy group and a carboxy group in an alkali metal salt form.

From the aspect of flexibility of the separation functional laver, the viscosity of a 0.2 wt % aqueous noncrosslinked polymer solution is preferably 100-1,500 mPa·s, more preferably 150-1,200 mPa·s, further preferably 200-1,000 mPa·s. The viscosity value is measured by a B-type viscometer under the conditions of pH 7, temperature 25° C. and rotating speed 20 rpm.

When the aforementioned noncrosslinked polymer is used, the amount thereof is preferably 1-80 parts by weight, more preferably 1-60 parts by weight, further preferably 1-50 parts by weight, per 100 parts by weight of the aforementioned crosslinked polymer from the aspect of membrane-forming performance.

The gel of the present invention may contain a basic compound. The basic compound may be only one kind or two or more kinds. Examples of the basic compound include carbonates, hydrogen carbonates and hydroxides of alkali metal, and amines.

Examples of the alkali metal carbonate include lithium carbonate, sodium carbonate, potassium carbonate, rubidium carbonate, and cesium carbonate and the like. Examples of the alkali metal hydrogen carbonate include lithium hydrogen carbonate, sodium hydrogen carbonate, potassium hydrogen carbonate, rubidium hydrogen carbonate, and cesium hydrogen carbonate and the like. Examples of the alkali metal hydroxide include lithium hydroxide, sodium hydroxide, potassium hydroxide, rubidium hydroxide, and cesium hydroxide and the like.

Examples of the amines include alkanolamines (e.g., monoethanolamine), amines having one primary amino group such as 3-amino-1-propanol and the like, amines having one secondary amino group such as diethanolamine, 2-methylaminoisopropanol and the like, amines having one tertiary amino group such as triethanolamine and the like, amines having two primary amino groups such as ethylenediamine and the like, amines having two secondary amino groups such as N,N'-bis(2-hydroxyethyl)ethylenediamine and the like, amines having one cyclic amino group such as pyrrolidine, piperidine, morpholine, N-methylmorpholine, thiomorpholine, hexamethylenimine and the like, amines having two cyclic amino groups such as piperazine, 2-methylpiperazine, 1-methylpiperazine, 1,4-dimethylpiperazine and the like, and amines having plural amino groups such as diethylenetriamine, tetraethylenepentamine and the like.

The basic compound is preferably at least one selected from the group consisting of carbonates, hydrogen carbonates and hydroxides of alkali metal, and amines, more preferably at least one selected from the group consisting of carbonates, hydrogen carbonates and hydroxides of alkali metal, further preferably at least one selected from the group consisting of carbonates, hydrogen carbonates and hydroxides of at least one alkali metal selected from the group consisting of Na, K, Rb, and Cs, particularly preferably at least one selected from the group consisting of cesium carbonate and cesium hydroxide.

When the gel of the present invention contains a basic compound, the amount thereof is preferably 0.1-5 mol, more preferably 0.1-4.5 mol, further preferably 0.1-4 mol, relative to a total of 1 mol of the acidic dissociative group, the acidic dissociative group in a salt form, and the derivative group of the acidic dissociative group in the crosslinked polymer.

When the gel of the present invention contains a basic compound, the amount thereof is preferably 1-5 mol, more preferably 1-4.5 mol, further preferably 1-4 mol, relative to a total of 1 mol of the acidic dissociative group, the acidic dissociative group in a salt form, and the derivative group of the acidic dissociative group in the crosslinked polymer.

The gel of the present invention may further contain amino acids such as glycine, alanine, serine, proline, taurine, diaminopropionic acid, 2-aminopropionic acid, 2-aminoisobtyric acid, 3,4-dihydroxyphenylalanine and the like or salts thereof is as an acidic gas carrier.

The gel of the present invention may also contain a filler. The filler may be only one kind or two or more kinds thereof. The filler may be an organic filler or an inorganic filler. Examples of the organic filler include starch, pulp, cellulose, polystyrene-based resin, modified melanin resin, lignin, rubber powder, epoxy-based resin and the like, and biodegradable resin (e.g., polylactic acid etc.) and examples of the inorganic filler include talc, silica, diatomaceous earth, kaolin, mica, plaster, graphite, alumina, zirconia, titania and ceramics. As the filler, moreover, one treated by a known method using a known surface modifier can also be used.

The gel of the present invention may contain a surfactant. The surfactant may be only one kind or two or more kinds thereof. Examples of the surfactant include polyoxyethylene polyoxypropylene glycols, polyoxyethylene alkylphenyl ethers, polyoxyethylene alkyl ethers, fluorochemical surfactant, silicone-based surfactant and the like.

The gel of the present invention may also contain water. When the gel of the present invention contains water, the content of water in the gel (i.e., amount of water relative to the whole gel is preferably 1-99.9% by weight, more preferably 3-99.9% by weight, further preferably 3-99% by weight, particularly preferably 5-98% by weight.

Production Method of Gel

The gel of the present invention can be produced, for example, by mixing the aforementioned crosslinked polymer and Compound. (I).

In addition, the gel of the present invention can also be produced by a method including drying and heating a mixture of at least one selected from the group consisting of Compound (I) and the condensate of Compound (I) (hereinafter sometimes to be indicated as "the first condensate of Compound (I)", water and the aforementioned crosslinked polymer to form a condensate of Compound (I) (hereinafter sometimes to be indicated as "the second condensate of Compound (I)" (hereinafter sometimes to be abbreviated as "the production method of gel"). By such method, a gel in which the aforementioned crosslinked polymer and the second condensate of Compound (I) form an interpenetrating network can be produced. As the first condensate of Compound (I), one that is further condensed during the process of the production method of gel is preferably used.

In the production method of gel, all of Compound (I), the first condensate of Compound (I) and the aforementioned crosslinked polymer may be respectively only one kind or two or more kinds thereof. Furthermore, the mixture used in the production method of gel may contain the aforementioned noncrosslinked polymer, basic compound, filler, surfactant, tetraalkoxysilane and the like. The noncrosslinked polymer and the like may be respectively only one kind or two or more kinds thereof. The amount of the noncrosslinked polymer and the like to be used in the production method of gel can be appropriately determined based on the predetermined amount thereof in the produced gel. The "at least one selected from the group consisting of Compound (I) and the first condensate of Compound (I)" is preferably Compound (I).

In the production method of gel, the mixture preferably further contains a noncrosslinked polymer having at least one selected from the group consisting of an acidic dissociative group, an acidic dissociative group in a salt form, and a derivative group of an acidic dissociative group. The explanation of the noncrosslinked polymer is as mentioned above.

In the production method of gel, the mixture preferably further contains a basic compound. The explanation of the basic compound is as mentioned above.

The mixture used in the production method of gel optionally contains an organic solvent that does not inhibit the reaction. The organic solvent may be only one kind or two or more kinds thereof. Examples of the organic solvent include protic polar organic solvents such as methanol, ethanol, 1-propanol, 2-propanol and the like; aprotic polar organic solvents such as acetone, methyl ethyl ketone, methyl isobutyl ketone, tetrahydrofuran, dioxane, N-methylpyrrolidone, N,N-dimethylacetamide, N,N-dimethylformamide and the like.

The content of water in the mixture (i.e., amount of water relative to the whole mixture) is preferably not less than 10% by weight, more preferably not less than 30% by weight, preferably not more than 99.9% by weight, more preferably not more than 95% by weight, further preferably not more than 90% by weight. The rest other than water includes at least one selected from the group consisting of Compound (I) and the first condensate of Compound (I), the aforementioned crosslinked polymer, other components used as necessary and an organic solvent. The amount of at least one selected from the group consisting of Compound (I) and the first condensate of Compound (I) to be used and the amount of the crosslinked polymer to be used can be appropriately determined based on the predetermined amounts of the crosslinked polymer and Compound (I) in the produced gel.

Drying of the mixture means removal of water from the mixture. When an organic solvent is co-present, the organic solvent may also be removed together with water. The mixture may be dried before heating the mixture (e.g., drying under reduced pressure), or simultaneously with heating of the mixture (e.g., drying by heating or combination of drying under reduced pressure and drying by heating). The drying is preferably performed together with heating of the mixture. The amount of water to be removed is determined by the water content of the gel obtained after heating and drying (i.e., amount of water relative to the whole gel). The water content is preferably 5-60% by weight, more preferably 5-50% by weight, further preferably 8-50% by weight, particularly preferably 10-50% by weight__ When drying under reduced pressure is performed, the ambient pressure of the mixture is preferably 1 Pa-1.0× $10^5$ Pa.

The heating temperature of the mixture is preferably 50-160° C., more preferably 60-150° C., and the heating time is preferably 10 min-4 hr, more preferably 10 min-2 hr. The heating can be performed under an air atmosphere.

To control the water content of the gel during use, the mixture is dried and heated to form the second condensate of Compound (I), the gel of the present invention is obtained, and then water may be added to the obtained gel.

In the production method of gel, the total amount of Compound (Ia) contained in the mixture and a structure derived from Compound (Ia) in the first condensate of Compound (I) is preferably 1-100 mol, more preferably 5-100 mol, still more preferably 5-100 mol, further preferably 10-100 mol, furthermore preferably 20-100 mol, particularly preferably 50-100 mol, particularly furthermore preferably 70-100 mol, most preferably 100 mol, per 100 mol of the total of all Compound (I) contained in the mixture and all the structures derived from Compound (I) in the first condensate of Compound (I).

Acidic Gas Separation Membrane

The acidic gas separation membrane of the present invention contains the aforementioned gel. The gel in the acidic gas separation membrane preferably has a membrane shape (hereinafter sometimes to be abbreviated as "gel membrane"). That is, the acidic gas separation membrane of the present invention preferably contains a gel membrane.

The acidic gas is preferably at least one kind selected from the group consisting of carbon dioxide, hydrogen sulfide, carbonyl sulfide, sulfur oxide ($SO_x$), hydrogen cyanide, and nitrogen oxide ($NO_x$), more preferably at least one kind selected from the group consisting of carbon dioxide and hydrogen sulfide.

The thickness of the gel membrane in the acidic gas separation membrane of the present invention is preferably 0.1-600 μm, more preferably 0.5-400 μm, further preferably 1-200 μm.

The gel (particularly gel membrane) in the acidic gas separation membrane preferably contains water to perform selective separation of acidic gas from other gas by permeation through the gel. The water content of the gel (i.e., amount of water relative to the whole gel) is preferably 5-80% by weight, more preferably 5-70% by weight, further preferably 8-70% by weight, particularly preferably 10-60% by weight.

The acidic gas separation membrane of the present invention may be composed of the aforementioned gel or may contain the aforementioned gel and other member (e.g., porous membrane). The acidic gas separation membrane of the present invention preferably contains a porous membrane. The porous membrane may be a single layer membrane or a laminate membrane. The acidic gas separation membrane of the present invention more preferably has a structure in which a gel membrane is placed in between two sheets of porous membrane. The two sheets of porous membrane may be the same or different.

The porous membrane may be hydrophilic or hydrophobic. Examples of the material of the porous membrane include is fluororesin, polyolefin, polyamide-based resin, polysulfone-based resin, ceramics, metal and the like. Of these, fluororesin is preferable and tetrafluoroethylene copolymer (PTFE) is more preferable. That is, the porous membrane is preferably a fluororesin porous membrane, more preferably a PTFE porous membrane.

While the thickness of the porous membrane is not particularly limited, the thickness thereof is preferably 10-3,000 μm, more preferably 10-500 μm, further preferably 15-150 μm, from the aspect of mechanical strength.

The heat resistance of the porous membrane is preferably not less than 100° C. The "heat resistance of not less than 100° C." means that a porous membrane after preservation at not less than 100° C. for 2 hr still maintains the form before preservation and is free of curl due to heat shrink or thermal melting, which curl can be confirmed by visual observation.

From the aspects of mechanical strength and adhesion to the gel of the present invention, the porosity of the porous membrane is preferably not less than 50% by volume, more preferably not less than 55% by volume, preferably not more than 99% by volume, more preferably not more than 95% by volume. From the similar aspects, the pore size of the porous membrane is preferably 0.005-10 μm, more preferably 0.005-1 μm.

The acidic gas separation membrane of the present invention can be used for, for example, a gas separation and recovery apparatus as a membrane-absorption hybrid method used in combination with the absorbing solution and the like described in JP-A-2007-297 05.

Production Method of Acidic Gas Separation Membrane

The acidic gas separation membrane of the present invention can be produced by, for example, a method containing the following steps (hereinafter sometimes to be abbreviated as "the production method of separation membrane"):

a step of applying a mixture of at least one selected from the group consisting of Compound (I) and the condensate of Compound (I) (hereinafter sometimes to be indicated as "the first condensate of Compound (I)"), water and the aforementioned crosslinked polymer to a substrate to form a coated film, and a step of drying and heating the coated film to form the condensate of Compound (I) (hereinafter sometimes to be indicated as "the second condensate of Compound (I)"), thus affording the gel of the present invention.

Unless particularly indicated, the explanations of the mixture and components thereof (i.e., crosslinked polymer, Compound (I), the first condensate of Compound (I), other components etc.) in the production method of separation membrane are the same as those of the production method of the aforementioned gel. The substrate is preferably a porous membrane. The explanation of the porous membrane is as mentioned above.

The content of water in the mixture to be applied to the substrate (i.e., amount of water relative to the whole mixture) is preferably not less than 10% by weight, more preferably not less than 30% by weight, preferably not more than 99.9% by weight, more preferably not more than 95% by weight, further preferably not more than 90% by weight. The temperature of the mixture when applied to the substrate is preferably 10-90° C., more preferably 10-80° C.

A method of applying the mixture to a substrate is not particularly limited, and examples thereof include spin coating, bar coating, die coating, blade coating, air knife coating, gravure coating, roll coating, spray coating, dip coating, comma roll method, kiss coating, screen printing, inkjet printing and the like. The solid content of the mixture to be applied per unit area is preferably 1-1,000 g/m2, more preferably 5-750 g/m$^2$, further preferably 10-500 g/m$^2$.

The mixture to be applied to the substrate may contain a surfactant. The surfactant is not particularly limited, and a conventionally-known surfactant can be used. Examples of the surfactant include polyoxyethylene polyoxypropylene glycols, polyoxyethylene alkylphenyl ethers, polyoxyethylene alkyl ethers, fluorochemical surfactant, silicone-based surfactant and the like. The surfactant may be only one kind or two or more kinds thereof. When a mixture not containing a surfactant is applied to a substrate (particularly, hydrophobic substrate), a surfactant may be applied in advance to a surface of the substrate.

The mixture may be applied to a substrate to form a coated film and a substrate may be further overlaid on the coated film. The two sheets of substrate sandwiching the coated film may be the same or different. The substrate is preferably a porous membrane. The explanation of the porous membrane is as mentioned above.

The drying and heating of the coated film in the production method of separation membrane can be performed in the same manner as in the drying and heating of the mixture in the production method of gel.

Drying of the coated film means removal of water from the coated film. When an organic solvent is co-present, the organic solvent may also be removed together with water. Drying in the production method of separation membrane can be performed in the same manner as in the drying in the production method of gel. The drying is preferably performed together with heating of the coated film. The amount of water to be removed is determined by the water content of the obtained gel in the obtained separation membrane (i.e., amount of water relative to the whole gel). The water content is preferably 5-60% by weight, more preferably 5-50% by weight, further preferably 8-50% by weight, particularly preferably 10-50% by weight.

The heating temperature of the coated film is preferably 50-160° C., more preferably 60-150° C., and the heating time is preferably 10 min-4 hr, more preferably 10 min-2 hr. The heating can be performed under an air atmosphere.

To control the water content of the gel in the acidic gas separation membrane, the coated film is dried and heated to form the second condensate of Compound (I), the gel of the present invention is obtained, and then water may be added to the obtained gel.

Acidic Gas Separation Apparatus

The acidic gas separation apparatus of the present invention contains the aforementioned acidic gas separation membrane. The acidic gas separation apparatus of the present invention preferably contains an acidic gas separation membrane element and/or an acidic gas separation membrane module containing the aforementioned acidic gas separation membrane. Examples of the type of the element include spiral type, hollow fiber type, pleat type, tube type, plate & frame type and the like. The acidic gas separation membrane module contains one or more acidic gas separation membrane elements in the housing and generally has a source gas supply port, a nonpermeated as exhaust port, a permeated gas exhaust port and, where necessary, a sweep gas supply port.

Method for Separating Acidic Gas

The present invention also provides a method for separating an acidic gas by contacting a mixed gas containing at least one kind of the aforementioned acidic gas and at least one kind of nonacidic gas with the acidic gas separation membrane of the present invention.

The acidic gas is preferably at least one kind selected from the group consisting of carbon dioxide, hydrogen sulfide, carbonyl sulfide, sulfur oxide ($SO_x$), hydrogen cyanide, and nitrogen oxide ($NO_x$), more preferably at least one kind selected from the group consisting of carbon dioxide and hydrogen sulfide. The nonacidic gas is preferably at least one kind selected from the group consisting of hydrogen, hydrocarbon, nitrogen, and carbon monoxide, more preferably at least one kind selected from the group consisting of hydrogen, hydrocarbon and nitrogen.

As the combination of the acidic gas and nonacidic gas, a combination of at least one kind selected from the group consisting of carbon dioxide, hydrogen sulfide, carbonyl sulfide, sulfur oxide ($SO_x$), hydrogen cyanide and nitrogen oxide ($NO_x$) as the acidic gas and at least one kind selected from the group consisting of hydrogen, hydrocarbon, nitrogen and carbon monoxide as the nonacidic gas is preferable, a combination of at least one kind selected from the group consisting of carbon dioxide and hydrogen sulfide as the acidic gas and at least one kind selected from the group consisting of hydrogen, hydrocarbon, nitrogen and carbon monoxide as the nonacidic gas is more preferable, and a combination of at least one kind selected from the group consisting of carbon dioxide and hydrogen sulfide as the acidic gas and at least one kind selected from the group consisting of hydrogen, hydrocarbon and nitrogen as the nonacidic gas is further preferable.

The mixed gas preferably contains water. The relative humidity of the mixed gas is preferably 30-100% RH, more preferably 50-100% RH, further preferably 70-100% RH. When the mixed gas is in a dry state, the gel in the acidic gas separation membrane preferably contains water.

The mixed gas preferably contains 1 ppm-60%, more preferably 1 ppm-50%, of an acidic gas. The aforementioned ppm and % are both based on the volume. The acidic gas separation method of the present invention can selectively separate an acidic gas even from a mixed gas containing the acidic gas at a low concentration. While the temperature of the mixed gas to be separated is not particularly limited, it is preferably 10-140° C.

An acidic gas is selectively separated from a mixed gas containing the acidic gas and a nonacidic gas by the method of the present invention, and the acidic gas may be further separated and/or removed by a combined use of an existing desulphurization process or acidic gas separation process such as chemical absorption method and the like. In addition, the load of the existing process can be reduced by using the method of the present invention in combination with the existing desulphurization process or acidic gas separation process.

The field of application of the gas separation method of the present invention is not particularly limited. Examples of the applicable field include separation of an acidic gas from a bio gas (digestion gas) containing acidic gas generated by an anaerobic treatment method; separation of acidic gas in coal gasification electricity generation or SOFC; hydrodesulfurization and/or purification of various kinds of petroleum or gas; separation of acidic gas in natural gas plant, petroleum-associated gas plant, chemicals production plant, synthesis gas production, reforming, EOR (Enhanced Oil Recovery) or GTL (Gas to Liquid); separation of acidic gas in factory exhaust gas; air conditioning; pre-treatment for known acidic gas separation technique (adsorption separation method, chemical absorption method, cryogenic separation) or desulfurization method (dry desulfurization method, wet desulfurization method, microbial desulfurization method) and the like; and replacements for known acidic gas separation technique or desulfurization method and the like.

EXAMPLES

While the present invention is explained in the following by referring to Examples, the present invention is not limited thereby.

Example 1

Water (42.2 g), crosslinked polyacrylic acid ("AQUPEC HV-501" manufactured by Sumitomo Seika Chemicals Company Limited) (1.1 g), and noncrosslinked polyacrylic acid ("AQUPAANA AP-40F" manufactured by Sumitomo Seika Chemicals Company Limited) (0.2 g) were mixed and stirred to give a uniform viscous solution. To the obtained viscous solution were added 3-(dimethylamino)propyltrimethoxysilane ("D4328" manufactured by Tokyo Chemical Industry Co., Ltd.) (7.1 g) and 10 wt % aqueous surfactant. ("Surflon S-242" manufactured by ACC Siemi Chemical Co., Ltd.) solution (0.4 g) and they were mixed to give a coating liquid (amount of amino group derived from Compound (I) (3-(dimethylamino)propyltrimethoxysilane) per 1 mol of carboxy group possessed by crosslinked polymer (crosslinked polyacrylic acid)=2 mol). The obtained coating liquid was applied onto a hydrophobic PTFE porous membrane ("Poreflon HP-010-50" manufactured by Sumitomo Electric Fine Polymer, Inc., membrane thickness 50 μm, pore size 0.1 μm, 40 g/m$^2$) to form a coated film, and a hydrophobic PTFE porous membrane was placed on the obtained coated film. Using a dryer, the coated film was dried and heated under the conditions of air atmosphere at about 100° C. for about 10 min to perform hydrolysis and condensation of 3-(dimethylamino)propyltrimethoxysilane to give a condensate thereof, from which a gas separation membrane (a-1) (thickness of gel membrane 20 μm) and a gas separation membrane (a-2) (thickness of gel membrane 50 μm) were produced. The content of water in the gel membrane in the gas separation membranes obtained in this Example was 35% by weight.

The viscosity of 0.2 wt % aqueous solution of the crosslinked polyacrylic acid used was 4300 mPa·s as measured by a B-type viscometer under the conditions of pH 7, temperature 25° C. and rotating speed 20 rpm. Similarly, the viscosity of 0.2 wt % aqueous solution of the noncrosslinked polyacrylic acid used was 900 mPa·s as measured by a B-type viscometer under the conditions of pH 7, temperature 25° C. and rotating speed 20 rpm.

Example 2

Water (24.8 g), crosslinked polyacrylic acid ("AQUPEC HV-501" manufactured by Sumitomo Seika Chemicals Company Limited) (0.5 g), noncrosslinked polyacrylic acid ("AQUPAANA AP-40F" manufactured by Sumitomo Seika Chemicals Company Limited) (0.1 g) and 50 wt % aqueous cesium hydroxide solution (2.5 g) for converting carboxy group to a salt form were mixed and stirred to give a uniform viscous solution. To the obtained viscous solution were added 3-(dimethylamino)propyltrimethoxysilane ("D4328" manufactured by Tokyo Chemical Industry Co., Ltd.) (1.8 g) and 10 wt % aqueous surfactant ("Surflon S-242" manufactured by AGC Seimi Chemical Co., Ltd.) solution (0.2 g) and they were mixed to give a coating liquid (amount of amino group derived from Compound (I) (3-(dimethylamino)propyltrimethoxysilane) per 1 mol of carboxy group in a salt form possessed by crosslinked polymer (crosslinked polyacrylic acid)=1 mol). Using the obtained coating liquid and in the same manner as in Example 1, a gas separation membrane (b-1) (thickness of gel membrane 20 μm) and a gas separation membrane (b-2) (thickness of gel membrane 50 μm) were produced. The content of water in the gel membrane in the gas separation membranes obtained in this Example was 33% by weight.

Example 3

Water (51.6 g), crosslinked polyacrylic acid ("AQUPEC HV-501" manufactured by Sumitomo Seika Chemicals Company Limited) (1.1 q) and noncrosslinked polyacrylic acid ("AQUPAANA AP-40F" manufactured by Sumitomo Seika Chemicals Company Limited) (0.2 g) were mixed and stirred to give a uniform viscous solution. To the obtained viscous solution were added 3-(dimethylamino)propyltrimethoxysilane ("D4328" manufactured by Tokyo Chemical industry Co., Ltd.) (3.7 g), 3-(dimethylamino)propylmethyldimethoxysilane ("AB252529" manufactured by abcr GmbH) (3.2 g) , and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-(dimethylamino)propyltrimethoxysilane and 3-(dimethylamino)propylmethyldimethoxysilane) per 1 mol of carboxy group possessed by crosslinked polymer (crosslinked polyacrylic acid)=2 mol). Using the obtained coating liquid and in the same manner as in Example 1, a gas separation membrane (c-1) (thickness of gel membrane 20 μm) and a gas separation membrane (c-2) (thickness of gel membrane 50 μm) were produced. The content of water in the gel membrane in the gas separation membranes obtained in this Example was 36% by weight.

Example 4

Water (51.6 g), crosslinked polyacrylic acid ("AQUPEC HV-501" manufactured by Sumitomo Seika Chemicals Company Limited) (1.1 g) and noncrosslinked polyacrylic acid ("AQUPAANA AP-40F" manufactured by Sumitomo Seika Chemicals Company Limited) (0.2 g) were mixed and stirred to give a uniform viscous solution. To the obtained viscous solution were added 3-(dimethylamino)propyltrimethoxysilane ("D4328" manufactured by Tokyo Chemical Industry Co., Ltd.) (1.9 g), 3-(dimethylamino)propylmethyldimethoxysilane ("AB252529" manufactured by abcr GmbH) (4.9 g), and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-(dimethylamino) propyltrimethoxysilane and 3-(dimethylamino)propylmethyldimethoxysilane) per 1 mol of carboxy group possessed by crosslinked polymer (crosslinked polyacrylic acid) =2 mol). Using the obtained coating liquid and in the same manner as in Example 1, a gas separation membrane (d-1) (thickness of gel membrane 20 μm) and a gas separation membrane (d-2) (thickness of gel membrane 50 μm) were produced.

Example 5

Water (51.7 g), crosslinked polyacrylic acid ("AQUPEC HV-501" manufactured by Sumitomo Seika Chemicals Company Limited) (1.1 g) and noncrosslinked polyacrylic acid ("AQUPAANA AP-40F" manufactured by Sumitomo Seika Chemicals Company Limited) (0.2 g) were mixed and stirred to give a uniform viscous solution. To the obtained viscous solution were added 3-(dimethylamino)propyltrimethoxysilane ("D4328" manufactured by Tokyo Chemical Industry Co., Ltd.). (0.4 g), 3-(dimethylamino)propylmethyldimethoxysilane ("A5252529" manufactured by abcr GmbH) (6.2 g), and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-(dimethylamino)propyltrimethoxysilane and 3-(dimethylamino)propylmethyldimethoxysilane) per 1 mol of carboxy group possessed by crosslinked polymer (crosslinked polyacrylic acid)=2 mol). Using the obtained coating liquid is and in the same manner as in Example 1, a gas separation membrane (e-1) (thickness of gel membrane 20 μm) and a gas separation membrane (e-2) (thickness of gel membrane 50 μm) were produced.

Example 6

Water (48.9 g), crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g) and 50 wt % aqueous cesium hydroxide solution (5.0 g) for converting carboxy group to a salt form were mixed and stirred to give a uniform viscous solution. To the obtained viscous solution were added a condensate of aminopropyltrimethoxysilane ("Dynasilane HYDROSIL 1153" manufactured by Evonik) (4.4 g) and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-aminopropyltrimethoxysilane) per 1 mol of carboxy group in a salt form possessed by crosslinked polymer (crosslinked polyacrylic acid)=1 mol). Using the obtained coating liquid and in the same manner as in Example 1, a gas separation membrane (f-1) (thickness of gel membrane 20 μm) and a gas separation membrane (f-2) (thickness of gel membrane 50 μm) were produced. The content of water in the gel membrane in the gas separation membranes obtained in this Example was 23% by weight.

Example 7

Water (44.8 g) and a cesium salt of crosslinked polyacrylic acid-poly(vinyl alcohol) copolymer (manufactured by Sumitomo Seika Chemicals Company Limited "SS-gel") (1.9 g) were mixed and stirred to give a uniform viscous solution. To the obtained viscous solution were added 3-(dimethylamino)propyltrimethoxysilane ("D4328" manufactured by Tokyo Chemical Industry Co., Ltd.) (3.7 g) and 10 wt % aqueous surfactant ("Surflon S-242" manufactured by AGC Seimi Chemical. Co., Ltd.) solution (0.4 g) and they were mixed to give a coating liquid (amount of amino group derived from Compound (I) (3-aminopropyltrimethoxysilane) per 1 mol of carboxy group in a salt form possessed by crosslinked polymer (cesium salt of crosslinked polyacrylic acid-poly (vinyl alcohol) copolymer)=2.5 mol). Using the obtained coating liquid and in the same manner as in Example 1, a gas separation membrane (g-1) (thickness of gel membrane 20 μm) and a gas separation membrane (g-2) (thickness of gel membrane 50 μm) were produced. The content of water in the gel membrane in the gas separation membranes obtained in this Example was 13% by weight.

Example 8

Water (69.6 g), a potassium salt of crosslinked polyacrylamide-polyacrylic acid copolymer ("product number 432776" purchased from. Sigma-Aldrich Co. LLC.) (0.5 g) and noncrosslinked polyacrylic acid ("AQUPAANA AP-40F" manufactured by Sumitomo Seika Chemicals Company Limited) (0.5 g) were mixed and stirred to give a uniform viscous solution. To the obtained viscous solution were added (dimethylamino)propyltrimethoxysilane ("D4328" manufactured by Tokyo Chemical industry Co., Ltd.) (4.9 g) and 10 wt % aqueous surfactant ("Surflon S-242" manufactured by AGO Seimi Chemical Co., Ltd.) solution (0.4 g) and they were mixed to give a coating liquid. (amount of amino group derived from Compound (I) (3-aminopropyltrimethoxysilane) per 1 mol of a total of carboxy group in a salt form and a derivative group of carboxy group (amido group) possessed by crosslinked polymer (potassium salt of crosslinked polyacrylamide-polyacrylic acid copolymer)=1.3 mol). Using the obtained coating liquid and in the same manner as in Example 1, a gas separation membrane (h) (thickness of gel membrane 60 μm) was produced. The content of water in the gel membrane in the gas separation membrane obtained in this Example was 14% by weight.

Example 9

Water (49.4 g), crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g) and 50 wt % aqueous cesium hydroxide solution (5.0 g) for converting carboxy group to a salt form were mixed and stirred to give a uniform viscous solution. To the obtained viscous solution were added 3-(2-aminoethylamino)propyltrimethoxysilane ("A0774" manufactured by Tokyo Chemical Industry Co., Ltd.) (3.9 g) and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-(2-aminoethylamino)propyltrimethoxysilane) per 1 mol of carboxy group in a salt form possessed by crosslinked polymer (crosslinked polyacrylic acid)=2 mol). Using the obtained coating liquid and in the same manner as in Example 1, a gas separation membrane (i-1) (thickness of gel membrane 20 μm) and a gas separation membrane (i-2) (thickness of gel membrane 50 μm) were produced. The content of water in the gel membrane in the gas separation membranes obtained in this Example was 14% by weight.

Example 10

Water (53.3 q), crosslinked polyacrylic acid ("AQUPEC HV-501" manufactured by Sumitomo Seika Chemicals Company Limited) (1.1 g), noncrosslinked polyacrylic acid ("AQUPAANA AP-40F" manufactured by Sumitomo Seika Chemicals Company Limited) (0.2 g) and 50 wt % aqueous cesium hydroxide solution (5.0 g) for converting carboxy group to a salt form were mixed and stirred to give a uniform viscous solution. To the obtained viscous solution were added 3-piperazinopropyltrimethoxysilane ("LS-3600" manufactured by Shin-Etsu. Chemical Co., Ltd.) (4.4 g) and 10 wt % aqueous surfactant ("Surflon S-242" manufactured by AGC Seimi Chemical Co., Ltd.) solution (0.4 g) and they were mixed to give a coating liquid (amount of amino group derived from Compound (I) (3-piperazinopropyitrimethoxysilane) per 1 mol of carboxy group in a salt form possessed by crosslinked polymer (crosslinked polyacrylic acid)=2 mol). Using the obtained coating liquid and in the same manner as in Example 1, a gas separation membrane (j-1) (thickness of gel membrane 20 μm) and a gas separation membrane (j-2) (thickness of gel membrane 50 μm) were produced. The content of water in the gel membrane in the gas separation membranes obtained in this Example was 20% by weight.

Comparative Example 1

Water (55.3 g), crosslinked polyacrylic acid. ("AQUPEC HV-501" manufactured by Sumitomo Seika Chemicals Company Limited) (1.1 g) and noncrosslinked polyacrylic acid ("AQUPAANA AP-405" manufactured by Sumitomo Seika Chemicals Company Limited) (0.2 g) were mixed and stirred to give a uniform viscous solution. To the obtained viscous solution were added dimethylaminoethanol (3.1 g) as an acidic gas carrier and 10 wt % aqueous surfactant ("Surflon S-242" manufactured by AGC Seimi Chemical Co., Ltd.) solution (0.4 g) and they were mixed to give a coating liquid. Using the obtained coating liquid and in the same manner as in Example 1, a gas separation membrane (k-1) (thickness of gel membrane 20 μm) and a gas separation membrane (k-2) (thickness of gel membrane 50 μm) were produced.

Comparative Example 2

Water (42.6 g), noncrosslinked polyacrylic acid ("AQUPAANA AP-40F" manufactured by Sumitomo Seika Chemicals Company Limited) (1.4 g) and 50 wt % aqueous cesium hydroxide solution (3.2 g) for converting carboxy group to a salt form were mixed and stirred to give a uniform viscous solution. Thereto were added 3-(dimethylamino)propyltrimethoxysilane ("D4328" manufactured by Tokyo Chemical Industry Co., Ltd.) (3.7 g) and 10 wt % aqueous surfactant ("Surflon S-242" manufactured by AGO Seimi Chemical Co., Ltd.) solution (0.4 g) and they were mixed to give a coating liquid. Using the obtained coating liquid and in the same manner as in Example 1, a gas separation membrane (1) (thickness of gel membrane 50 μm) was produced.

Comparative Example 3

Water (52.5 g), crosslinked polyacrylic acid ("AQUPEC HV-501" manufactured by Sumitomo Seika Chemicals Company Limited) (1.1 g) and 50 wt % aqueous cesium hydroxide solution (4.5 g) for converting carboxy group to a salt form were mixed and stirred to give a uniform viscous solution. Thereto were added triethylamine (1.5 g) and 10 wt % aqueous surfactant ("Surflon S-242" manufactured by AGO Seimi Chemical Co., Ltd.) solution (0.4 g) and they were mixed to give a coating liquid. Using the obtained coating liquid and in the same manner as in Example 1, a gas separation membrane (m-1) (thickness of gel membrane 20 μm) and a gas separation membrane (m-2) (thickness of gel membrane 50 μm) were produced.

Gas Separation Performance Evaluation

The gas separation performance of the gas separation membranes obtained in Examples and Comparative Examples was measured as follows. First, using a gas separation apparatus provided with a flat membrane cell 51 of gas separation membrane, which is shown in FIG. 1, acidic gas was separated. To be specific, the gas separation membranes produced in the Examples and Comparative Examples were cut into a flat membrane shape with an appropriate size, and fixed between a supply side 52 and a permeation side 53 of each stainless flat membrane cell 51.

A gas separation performance evaluation experiment was performed under the following condition 1 and condition 2.

Condition 1

A mixed gas ($CO_2$: 40 mL/min, $N_2$: 360 mL/min, water: 56 μL/min) was supplied through a flow controller MFC to the supply side 52, and a sweep gas (Ar: 40 mL/min, water: 6 μL/min) was supplied to the permeation side 53 (water was supplied via respective feed pumps 58, 60). Using back pressure controllers 70 and 71, a back pressure of the supply side and the permeation side was adjusted to 0 kPa (gauge pressure). The gas flow after removal of the water vapor in the sweep gas discharged from the permeation side 53 by the cooling trap 56 was quantified based on the analysis results of the gas chromatograph 57, and the permeance (mol/m$^2$/sec/kPa) of $CO_2$ and $N_2$ contained in the permeated gas was calculated. The cell 51 was maintained at 60° C.

Condition 2

In the same manner as in Condition 1 except that the mixed gas was changed to $CO_2$: 40 mL/min, $H_2S$: 40 mL/min, $N_2$: 256 mL/min, water: 47 μL/min, the experiment was performed.

The gas separation membrane used in the gas separation performance evaluation under condition 1 and the permeance results are shown in Table 1, and the gas separation membrane used in the gas separation performance evaluation under condition 2 and the permeance results are shown in Table 2. Table 2 shows the ratio of $H_2S$ permeance and $CO_2$ permeance ($H_2S$ permeance/$CO_2$ permeance) (indicated as "$H_2S/CO_2$" in Table 2). The gas separation membrane of Comparative Example 2 was not subjected to the gas separation performance evaluation under condition 1. The gas separation membranes of Examples and Comparative Examples not described in Table 2 were not subjected to the gas separation performance evaluation under condition 2.

Acidic Gas Carrier Outflow Evaluation; Immersion Test

The gas separation membranes obtained in Examples and Comparative Examples were measured for the gel membrane weight change rate and carrier amount change rate by the following methods, and the acidic gas carrier outflow thereof was evaluated.
(1) A gas separation membrane produced was cut into 5×5 cm$^2$.
(2) The gas separation membrane thus cut was dried on a glass plate in an oven in an air atmosphere at 100° C. for 10 min.
(3) The weight of the dried gas separation membrane before immersion was measured.
(4) The amount of the carrier in the dried gas separation membrane before immersion was measured by CHN combustion elemental analysis method.
(5) The gas separation membrane thus cut, was immersed in 200 mL of hot water at 60° C. for 1 hr.
(6) The gas separation membrane was taken out from the hot water and dried on a glass plate in an oven in an air atmosphere at 100° C. for 20 min.
(7) The weight of the dried gas separation membrane after immersion was measured
(8) The amount of the carrier in the dried gas separation membrane after immersion was measured by CHN combustion elemental analysis method.
(9) The membrane weight change rate was calculated from the following formula:

gel membrane weight change rate (% by weight)=
100×{weight of dried gas separation membrane
after immersion (i.e., 5×5 cm$^2$ gel membrane
and two sheets of 5×5 cm$^2$ PTFE porous membrane)−weight of two sheets of 5×5 cm$^2$ PTFE porous membrane}/{dried gas separation membrane before immersion (i.e., weight of 5×5 cm2 gel membrane and two sheets of 5×5 cm² PTFE porous membrane)−weight of two sheets of 5×5 cm² PTFE porous membrane}

(10) The carrier amount change rate was calculated from the following formula:

carrier amount change rate (% by weight)=100× amount of N atom in dried gas separation membrane after immersion/amount of N atom in dried gas separation membrane before immersion The gas separation membrane used for the calculation of the gel membrane weight change rate and the results thereof are shown in Table 1, and the gas separation membrane used for the calculation of the carrier amount change rate and the results thereof are shown in Table 3. The gas separation membranes of Examples and Comparative Examples not described in Table 3 were not subjected to the calculation of the carrier amount change rate.

TABLE 1

| | gas separation performance evaluation | | acidic gas carrier outflow evaluation | |
|---|---|---|---|---|
| gas separation membrane | permeance (condition 1) (mol/m2/sec/kPa) | | gas separation membrane | gel membrane weight change rate (% by weight) |
| | $CO_2$ | $N_2$ | | |
| Ex. 1 | $2.2 \times 10^{-6}$ | below detection lower limit | (a-2) | 99 |
| Ex. 2 | $7.2 \times 10^{-6}$ | $5.8 \times 10^{-8}$ | (b-2) | 68 |
| Ex. 3 | $1.1 \times 10^{-6}$ | $3.7 \times 10^{-8}$ | (c-2) | 91 |
| Ex. 4 | $1.3 \times 10^{-6}$ | $4.6 \times 10^{-8}$ | (d-2) | 92 |
| Ex. 5 | $7.5 \times 10^{-7}$ | $4.2 \times 10^{-8}$ | (e-2) | 80 |
| Ex. 6 | $8.6 \times 10^{-6}$ | $2.9 \times 10^{-8}$ | (f-2) | 81 |
| Ex. 7 | $6.9 \times 10^{-6}$ | $1.2 \times 10^{-7}$ | (g-2) | 87 |
| Ex. 8 | $1.1 \times 10^{-6}$ | $6.9 \times 10^{-8}$ | (h) | 94 |
| Ex. 9 | $6.4 \times 10^{-6}$ | $9.7 \times 10^{-8}$ | (i-2) | 91 |
| Ex. 10 | $2.9 \times 10^{-6}$ | $3.2 \times 10^{-8}$ | (j-2) | 88 |
| Comp. Ex. 1 | $2.7 \times 10^{-6}$ | $8.0 \times 10^{-8}$ | (k-2) | 56 |
| Comp. Ex. 2 | not measured | | (l) | 55 |
| Comp. Ex. 3 | $4.3 \times 10^{-6}$ | $3.4 \times 10^{-8}$ | (m-2) | 37 |

TABLE 2

| | gas separation performance evaluation | | | |
|---|---|---|---|---|
| gas separation membrane | permeance (condition 2) (mol/m²/sec/kPa) | | | |
| | $CO_2$ | $H_2S$ | $N_2$ | $H_2S/CO_2$ |
| Ex. 2 | $4.9 \times 10^{-6}$ | $5.7 \times 10^{-6}$ | $3.2 \times 10^{-8}$ | 1.2 |
| Ex. 4 | $1.4 \times 10^{-6}$ | $6.6 \times 10^{-6}$ | $4.6 \times 10^{-8}$ | 4.6 |
| Ex. 9 | $5.2 \times 10^{-6}$ | $7.5 \times 10^{-6}$ | $4.0 \times 10^{-8}$ | 1.4 |
| Ex. 10 | $8.6 \times 10^{-7}$ | $3.7 \times 10^{-6}$ | $3.2 \times 10^{-8}$ | 4.4 |

TABLE 3

| | acidic gas carrier outflow evaluation | |
|---|---|---|
| | gas separation membrane | carrier amount change rate (% by weight) |
| Ex. 1 | (a-2) | about 100 |
| Ex. 3 | (c-2) | 90 |

TABLE 3-continued

| | acidic gas carrier outflow evaluation | |
|---|---|---|
| | gas separation membrane | carrier amount change rate (% by weight) |
| Ex. 4 | (d-2) | 100 |
| Ex. 5 | (e-2) | 92 |
| Ex. 10 | (j-2) | 86 |
| Comp. Ex. 1 | (k-2) | 64 |

As shown in Table 1, the gas separation membranes obtained in Examples 1-10 and Comparative Examples 1 and 3 showed high acidic gas permeance as compared to $N_2$ permeance, and functioned as acidic gas separation membranes. As shown in Table 2, the gas separation membranes obtained in Examples 2, 4, 9 and 10 showed higher $H_2S$ permeance than $CO_2$ permeance.

As shown in Table 1, the gas separation membranes containing a condensate of Compound (I) and a crosslinked polymer and obtained in Examples 1-10 showed smaller gel membrane weight change rate and can suppress carrier outflow as compared to the gas separation membranes not containing a condensate of Compound (I) and obtained in Comparative Examples 1 and 3 and the gas separation membrane not containing a crosslinked polymer and obtained in Comparative Example 2.

INDUSTRIAL APPLICABILITY

The gel of the present invention is useful for an acidic gas separation membrane.

EXPLANATION OF SYMBOLS

30, 31, 32, 33: flow controller (mass flow controller)
40: $CO_2$ cylinder
41: He or $N_2$ cylinder
42: Ar cylinder
43: $H_2S$ cylinder
51: flat membrane cell of gas separation membrane (50: gas separation membrane, 52: supply side, 53: permeation side)
56: cold trap
57: gas chromatograph
58, 60: feed pump
70, 71: back pressure controller

The invention claimed is:

1. A gel comprising a crosslinked polymer having at least one selected from the group consisting of an acidic dissociative group, an acidic dissociative group in a salt form, and a derivative group of an acidic dissociative group, and a condensate of a compound represented by the following formula (I):

$$Si\{R^1-N(R^2)(R^3)\}(OR^4)(OR^5)(R^6) \quad (I)$$

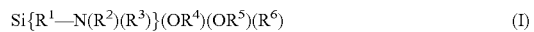

wherein
$R^1$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —$CH_2$— excluding —$CH_2$— adjacent to Si and —$CH_2$— adjacent to N in said alkylene group and cycloalkanediyl group is/are optionally replaced by at least one selected from the group consisting of —O— and —NR$^7$— wherein R$^7$ is a hydrogen atom, an alkyl group optionally having substituent(s), a cycloalkyl group optionally having substituent(s), an aryl group optionally having substituent(s) or an aralkyl group optionally having substituent(s), R$^2$ and R$^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), R$^4$ and R$^5$ are each independently a hydrogen atom, an alkyl group optionally having substituent(s), a cycloalkyl group optionally having substituent(s), an aryl group optionally having substituent(s), or an aralkyl group optionally having substituent(s), and R$^6$ is an alkyl group optionally having substituent(s), a cycloalkyl group optionally having substituent(s), an aryl group optionally having substituent(s), an aralkyl group optionally having substituent(s), a hydroxy group, an alkoxy group optionally having substituent(s), a cycloalkyloxy group optionally having substituent(s), an aryloxy group optionally having substituent(s), an aralkyloxy group optionally having substituent(s), or a group represented by —R$^{'1}$—N(R$^{'2}$)(R$^{'3}$), wherein R$^{'1}$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —CH$_2$— excluding —CH$_2$— adjacent to Si and —CH$_2$— adjacent to N in said alkylene group and cycloalkanediyl group is/are optionally replaced by at least one selected from the group consisting of —O— and —NR$^{'7}$— wherein R$^{'7}$ is a hydrogen atom, an alkyl group optionally having substituent(s), a cycloalkyl group optionally having substituent(s), an aryl group optionally having substituent(s) or an aralkyl group optionally having substituent(s), and R$^{'2}$ and R$^{'3}$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s).

2. The gel according to claim 1, wherein R$^1$ is an alkylene group optionally having substituent(s), and one or more —CH$_2$— excluding —CH$_2$— adjacent to Si and —CH$_2$— adjacent to N in said alkylene group is/are optionally replaced by —NR$^7$— wherein R$^7$ is a hydrogen atom or an alkyl group optionally having substituent(s), R$^2$ and R$^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), R$^4$ and R$^5$ are each independently a hydrogen atom or an alkyl group, and R$^6$ is an alkyl group optionally having substituent(s), a hydroxy group or an alkoxy group.

3. The gel according to claim 1, wherein the crosslinked polymer is an acrylic acid-based crosslinked polymer having at least one selected from the group consisting of a carboxy group, a carboxy group in a salt form, and a derivative group of a carboxy group.

4. The gel according to claim 1, wherein the crosslinked polymer and the condensate of the compound represented by the formula (I) form an interpenetrating network.

5. The gel according to claim 1, further comprising a noncrosslinked polymer comprising at least one selected from the group consisting of an acidic dissociative group, an acidic dissociative group in a salt form, and a derivative group of an acidic dissociative group.

6. The gel according to claim 1, further comprising a basic compound.

7. An acidic gas separation membrane comprising the gel according to claim 1.

8. The acidic gas separation membrane according to claim 7, further comprising a porous membrane.

9. An acidic gas separation apparatus comprising the acidic gas separation membrane according to claim 7.

10. A method for separating an acidic gas, comprising contacting a mixed gas comprising at least one kind of said acidic gas and at least one kind of nonacidic gas with the acidic gas separation membrane according to claim 7.

11. A method for producing a gel comprising a crosslinked polymer having at least one selected from the group consisting of an acidic dissociative group, an acidic dissociative group in a salt form, and a derivative group of an acidic dissociative group, and a condensate of a compound represented by the following formula (I):

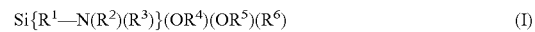

wherein

R$^1$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —CH$_2$— excluding —CH$_2$— adjacent to Si and —CH$_2$— adjacent to N in said alkylene group and cycloalkanediyl group is/are optionally replaced by at least one selected from the group consisting of —O— and —NR$^7$— wherein R$^7$ is a hydrogen atom, an alkyl group optionally having substituent(s), a cycloalkyl group optionally having substituent(s), an aryl group optionally having substituent(s) or an aralkyl group optionally having substituent(s), R$^2$ and R$^3$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), R$^4$ and R$^5$ are each independently a hydrogen atom, an alkyl group optionally having substituent(s), a cycloalkyl group optionally having substituent(s), an aryl group optionally having substituent(s), or an aralkyl group optionally having substituent(s), and $R^6$ is an alkyl group optionally having substituent(s), a cycloalkyl group optionally having substituent(s), an aryl group optionally having substituent(s), an aralkyl group optionally having substituent(s), a hydroxy group, an alkoxy group optionally having substituent(s), a cycloalkyloxy group optionally having substituent(s), an aryloxy group optionally having substituent(s), an aralkyloxy group optionally having substituent(s), or a group represented by —$R^{l1}$—$N(R^{l2})(R^{l3})$, wherein $R^{l1}$ is an alkylene group optionally having substituent(s), a cycloalkanediyl group optionally having substituent(s), an arenediyl group optionally having substituent(s), or a divalent group optionally having substituent(s) and being a combination of at least two selected from the group consisting of an alkylene group, a cycloalkanediyl group and an arenediyl group, and one or more —$CH_2$— excluding —$CH_2$— adjacent to Si and —$CH_2$— adjacent to N in said alkylene group and cycloalkanediyl group is/are optionally replaced by at least one selected from the group consisting of —O— and —$NR^{l7}$— wherein $R^{l7}$ is a hydrogen atom, an alkyl group optionally having substituent(s), a cycloalkyl group optionally having substituent(s), an aryl group optionally having substituent(s) or an aralkyl group optionally having substituent(s), and $R^{l2}$ and $R^{l3}$ are each independently a hydrogen atom, an alkyl group optionally having substituent(s), a cycloalkyl group optionally having substituent(s), an aryl group optionally having substituent(s), or an aralkyl group optionally having substituent(s), or they are bonded to each other to form, together with the adjacent nitrogen atom, a basic nitrogen-containing heterocycle optionally having substituent(s), the method comprising drying and heating a mixture comprising at least one selected from the group consisting of a compound represented by the formula (I) and a condensate of a compound represented by the formula (I), water and said crosslinked polymer to form a condensate of the compound represented by the formula (I).

\* \* \* \* \*